(12) United States Patent
Kwon et al.

(10) Patent No.: US 7,662,210 B2
(45) Date of Patent: Feb. 16, 2010

(54) APPARATUS FOR MANUFACTURING MOLTEN IRONS BY INJECTING FINE COALS INTO A MELTER-GASIFIER AND THE METHOD USING THE SAME

(75) Inventors: Young-Chul Kwon, Pohang (KR); Nam-Suk Hur, Pohang (KR); Young-Do Park, Pohang (KR); Hak-Dong Kim, Pohang (KR)

(73) Assignee: POSCO, Nam-ku, Pohang-shi, Kyungsangbuk-do (KR)

( * ) Notice: Subject to any disclaimer, the term of this patent is extended or adjusted under 35 U.S.C. 154(b) by 380 days.

(21) Appl. No.: 11/572,298

(22) PCT Filed: Jul. 29, 2005

(86) PCT No.: PCT/KR2005/002478

§ 371 (c)(1),
(2), (4) Date: Jan. 18, 2007

(87) PCT Pub. No.: WO2006/011774

PCT Pub. Date: Feb. 2, 2006

(65) Prior Publication Data

US 2008/0295647 A1    Dec. 4, 2008

(30) Foreign Application Priority Data

Jul. 30, 2004    (KR) ............... 10-2004-0060584
Apr. 22, 2005    (KR) ............... 10-2005-0033775

(51) Int. Cl.
C21B 11/02    (2006.01)
C21B 15/00    (2006.01)

(52) U.S. Cl. ............ 75/499; 75/503; 266/160; 266/216; 266/218; 266/175

(58) Field of Classification Search .......... 75/499, 75/503; 266/160, 175, 216, 218
See application file for complete search history.

(56) References Cited

U.S. PATENT DOCUMENTS 4,357,145 A * 11/1982 Dondelewski ............... 44/568

(Continued)

FOREIGN PATENT DOCUMENTS

DE    19950827    8/1995

(Continued)

OTHER PUBLICATIONS

Derwent Acc No. 2003-552486 for Patent Family KR 2003030495 A (Apr. 18, 2003) and KR 584735 B1(May 30, 2006). Abstract.*
Machine translation of application No. 10-2001-0062660, published Apr. 21, 2003. Application for patent family KR 2003030495 A (Apr. 18, 2003) and KR 584735 B1(May 30, 2006).*

Primary Examiner—George Wyszomierski
Assistant Examiner—Tima M McGuthry-Banks

(57) ABSTRACT

The present invention relates to an apparatus for manufacturing molten irons by injecting fine carbonaceous materials into a melter-gasifier and a method for manufacturing molten irons using the same. The method for manufacturing molten irons according to the present invention includes steps of reducing mixtures containing iron ores in a reduction reactor and converting the mixtures containing iron ores into reduced materials, preparing lumped carbonaceous materials containing volatile matters as a heating source for melting the reduced materials, charging the lumped carbonaceous materials into a dome-shaped upper portion of a melter-gasifier and forming a coal packed bed, preparing fine carbonaceous materials containing volatile matters as a heating source for melting the reduced materials, injecting oxygen and the fine carbonaceous materials into the coal packed bed through a tuyere installed in the melter-gasifier, charging the reduced materials into the melter-gasifier connected to the reduction reactor and manufacturing molten irons, and supplying reducing gas in the melter-gasifier made from volatile matters contained both in the lumped carbonaceous materials and the fine carbonaceous materials to the reduction reactor.

46 Claims, 10 Drawing Sheets

U.S. PATENT DOCUMENTS

| | | | |
|---|---|---|---|
| 4,652,342 A * | 3/1987 | Kuerston | 201/33 |
| 4,728,360 A * | 3/1988 | Hauk et al. | 75/381 |
| 4,978,387 A * | 12/1990 | Kepplinger | 75/445 |
| 4,995,904 A * | 2/1991 | Hauk | 75/445 |
| 5,185,032 A * | 2/1993 | Whipp | 75/436 |
| 5,630,862 A * | 5/1997 | Greenwalt | 75/445 |
| 2003/0041690 A1 | 3/2003 | Zirngast | |
| 2006/0119022 A1* | 6/2006 | Nam et al. | 266/172 |

FOREIGN PATENT DOCUMENTS

| | | |
|---|---|---|
| JP | 58-174511 | 10/1983 |
| JP | 62-224619 | 10/1987 |
| JP | 01205019 | 8/1989 |
| JP | 01-319620 | 12/1989 |
| JP | 02-141516 | 5/1990 |
| JP | 03-025542 | 3/1991 |
| JP | 05-009526 | 1/1993 |
| JP | 06-128617 | 5/1994 |
| JP | 11-315310 | 11/1999 |
| JP | 2002-508809 | 3/2002 |
| JP | 2003-531963 | 10/2003 |
| WO | 98-02586 | 1/1998 |
| WO | 2004/057042 | 7/2004 |

* cited by examiner

APPARATUS FOR MANUFACTURING MOLTEN IRONS BY INJECTING FINE COALS INTO A MELTER-GASIFIER AND THE METHOD USING THE SAME

BACKGROUND OF THE INVENTION

1. Field of the Invention

The present invention relates to an apparatus for manufacturing molten irons by injecting fine carbonaceous materials into a melter-gasifier and a method for manufacturing molten irons using the same, and more particularly, to an apparatus for manufacturing molten irons by charging carbonaceous materials and iron carriers into a melter-gasifier and injecting fine carbonaceous materials into the melter-gasifier and a method for manufacturing molten irons using the same.

2. Description of the Related Art

The iron and steel industry is a core industry that supplies the basic materials needed in construction and in the manufacture of automobiles, ships, home appliances, etc. Further, it is an industry which has the longest history having advanced since the dawn of human history. Iron works, which play a pivotal roll in the iron and steel industry, produce steel from molten iron, and then supply it to customers, after first producing the molten iron (i.e., pig iron in a molten state) using iron ores and coals as raw materials.

Nowadays, approximately 60% of the world's iron production is produced using a blast furnace method that has been developed since the 14th century. According to the blast furnace method, irons ores, which have gone through a sintering process, and cokes, which are produced using bituminous coals as raw materials, are charged into a blast furnace together and oxygen is supplied to the blast furnace to reduce the iron ores to irons, thereby manufacturing molten irons. The blast furnace method, which is the most popular in plants for manufacturing molten irons, requires that raw materials have strength of at least a predetermined level and have grain sizes that can ensure permeability in the furnace, taking into account reaction characteristics. For that reason, cokes that are obtained by processing specific raw coals are needed as carbon sources to be used as a fuel and as a reducing agent. Also, sintered ores that have gone through a successive agglomerating process are needed as iron sources. Accordingly, the modern blast furnace method requires raw material preliminary processing equipment, such as coke manufacturing equipment and sintering equipment. Namely, it is necessary to be equipped with subsidiary facilities in addition to the blast furnace, and also equipment for preventing and minimizing pollution generated by the subsidiary facilities. Therefore, the heavy investment in the additional facilities and equipment leads to increased manufacturing costs.

In order to solve these problems with the blast furnace method, significant effort is made in iron works all over the world to develop a smelting reduction process that produces molten irons in the melter-gasifier by directly using general coals as a fuel and as a reducing agent and by directly using iron ores as iron sources.

Since a coal packed bed consisting of coals is formed in the melter-gasifier, iron carriers and additives are melted and slagged in the coal packed bed, and are discharged as molten irons and slags. The oxygen is injected into the melter-gasifier through a plurality of tuyeres installed on the outer wall of the melter-gasifier, and burns the coal packed bed. Therefore, the oxygen is converted into a hot reducing gas and the hot reducing gas is supplied to the fluidized bed reactor. The hot reducing gas reduces and sinters iron carriers and additives and is discharged outside.

The lumped coals charged into the upper portion of the melter-gasifier are differentiated due to the sudden thermal shock while falling in a dome portion of the melter-gasifier that is maintained at a hot temperature of about 1000° C. In this case, a large amount of dust containing a large amount of carbon components is generated. Therefore, the permeability of the melter-gasifier is deteriorated due to the large amount of dust. For solving this problem, a dust burner is installed in the upper portion of the melter-gasifier and burns the dust while oxygen is injected to the melter-gasifier by the dust burner. By burning the dust, the combustion heat of the carbon components contained in the dust can be used.

Meanwhile, lumped coals are charged into the melter-gasifier and are rapidly heated in the dome portion thereof. The volatile matters contained in the lumped coals are firstly pyrolyzed as a pyrolysis gas having a chain structure of $C_nH_m$ or as a tar phase having a ring structure. The volatile matters are first pyrolyzed and are then re-pyrolyzed into a reducing gas, such as a CO gas and a $H_2$ gas. The heat, which is necessary for the pyrolyzing process, is absorbed during the process, and thereby the temperature of the dome portion is lowered. Therefore, extra oxygen, in addition to the oxygen which is necessary for burning the dust, is supplied by a dust burner or an oxygen burner in order to prevent a lowering of the temperature. A portion of the reducing gas formed in the dome portion of the melter-gasifier is burned by supplying the extra oxygen, and so prevents a lowering of the temperature thereof. However, in spite of such combustion, a portion of the coal pyrolysis gas or the tar is not completely pyrolyzed into $CO_2$ and $H_2$. Therefore, a portion of gas containing depyrolyzed hydrocarbon, such as $CH_4$, is contained in the reducing gas discharged from the melter-gasifier.

As described above, when the lumped coals are charged into the melter-gasifier, the combustion heat of the carbon contained in the volatile matters is mainly used in pyrolysis of the gas generated from the volatile matters themselves and raises the temperature of the pyrolysis gas. Carbonaceous materials are partly discharged out of the melter-gasifier without generating combustion heat. Therefore, only the amount of carbonaceous materials excepting the amount of carbon contained in the volatile matters among the entire amount of carbonaceous materials contained in the lumped coals is burned in the lower portion of the melter-gasifier. Accordingly, carbonaceous materials in an amount more than actually necessary should be used in order to supply a sufficient heat source for manufacturing molten irons. Meanwhile, depyrolyzed hydrocarbon gas, such as a $CH_4$, is discharged from the melter-gasifier while partly existing in the reducing gas. In addition, the reducing gas containing $CO_2$ and $H_2O$ is partly discharged since the excessive oxygen is injected through the dust burner. Therefore, there is a problem in that a reduction power of the reducing gas supplied to the reduction reactor is deteriorated.

SUMMARY OF THE INVENTION

The present invention has been made to solve the above-mentioned problems, and is contrived to minimize a fuel rate when manufacturing molten irons by injecting fine carbonaceous materials into the melter-gasifier and supplying a reducing gas having enhanced reduction power.

In addition, the present invention provides an apparatus for manufacturing molten irons having enhanced utilization efficiency of the combustion heat of coals by injecting fine carbonaceous materials.

For solving the above described problems, the present invention provides a method for manufacturing molten irons including the steps of reducing mixtures containing iron ores in a reduction reactor and converting the mixtures containing iron ores into reduced materials, preparing lumped carbonaceous materials containing volatile matters as a heating source for melting the reduced materials, charging the lumped carbonaceous materials into a dome-shaped upper portion of a melter-gasifier and forming a coal packed bed, preparing fine carbonaceous materials containing volatile matters as a heating source for melting the reduced materials, injecting oxygen and the fine carbonaceous materials into the coal packed bed through a tuyere installed in the melter-gasifier, charging the reduced materials into the melter-gasifier connected to the reduction reactor and manufacturing molten irons, and supplying the reducing gas in the melter-gasifier made from volatile matters contained both in the lumped carbonaceous materials and the fine carbonaceous materials to the reduction reactor.

The fine carbonaceous materials may contain volatile matters in the range from 8.0 wt % to 35.0 wt %, and the volatile matters may contain carbon and hydrogen in the step of preparing fine carbonaceous materials containing volatile matters as a heating source for melting the reduced materials.

The free swelling index (FSI) of the fine carbonaceous materials is preferably not more than 6.0.

The lumped carbonaceous materials may contain volatile matters in the range from 20.0 wt % to 35.0 wt %, and the volatile matters may contain carbon and hydrogen in the step of preparing lumped carbonaceous materials containing volatile matters as a heating source for melting the reduced materials.

It is preferable that the grain size of the lumped carbonaceous materials is in the range from 8 mm to 35 mm.

The step of preparing lumped carbonaceous materials preferably includes the steps of dividing raw coals into fine coals and lumped coals, and preparing lumped carbonaceous materials in which the lumped coals come in contact with hot gas and are then dried.

The method for manufacturing molten irons may further include a step of injecting the divided fine coals as the fine carbonaceous materials into the coal packed bed.

The method for manufacturing molten irons may further include a step of transferring fine coals, which are collected when the lumped coals come in contact with hot gas, and injecting the fine coals as the fine carbonaceous materials.

The lumped carbonaceous materials may include coal briquettes and the step of preparing lumped carbonaceous materials may include the steps of dividing the raw coals into fine coals and lumped coals and molding the fine coals and then manufacturing coal briquettes.

The step of manufacturing the coal briquettes may include the steps of drying the fine coals, adding a binder to the fine coals and mixing together, and molding the fine coals in which the binder is added and mixed together, and manufacturing coal briquettes.

The above described step of manufacturing the coal briquettes may further include a step of transferring fine coals collected in the step of drying the fine coals and injecting the fine coals as the fine carbonaceous materials.

It is preferable that the fine carbonaceous materials are made by crushing raw coals and a grain size of the crushed fine carbonaceous materials is not more than 3 mm in the step of injecting fine carbonaceous materials into the coal packed bed.

It is preferable that an oxidization ratio of the reducing gas decreases to be in the range of above 0% to 11.432% as an injecting amount of the fine carbonaceous materials increases in the step of supplying reducing gas to the reduction reactor.

It is preferable that an amount of $CH_4$ gas in the melter-gasifier decreases as an injecting amount of the fine carbonaceous materials increases and an oxidization ratio of the reducing gas decreases as the amount of the $CH_4$ gas decreases.

It is preferable that $y=0.0001x$ is substantially satisfied when x denotes an injecting amount of the fine carbonaceous materials and y denotes a reducing amount of $CH_4$ gas in the melter-gasifier. Here, the unit of x is kg/t-p, the unit of y is %, and the unit of 0.0001 is %/(kg/t-p).

It is preferable that $-3.4718 \leq 1.6653x-y \leq 1.3824$ is substantially satisfied when x denotes an amount of $CH_4$ gas in the melter-gasifier and y denotes an oxidization ratio of the reducing gas. Here, the unit of x is vol %, the unit of y is %, and the unit of 1.3824 is %/vol %.

It is preferable that $1.6653x-y=-1.1472$ is substantially satisfied when x denotes an amount of $CH_4$ gas in the melter-gasifier and y denotes an oxidization ratio of the reducing gas. Here, unit of x is vol %, the unit of y is %, and the unit of 1.6653 is %/vol %.

It is preferable that $y=-2.10x+103.9$ is substantially satisfied when x denotes an oxidization ratio of the reducing gas and y denotes a reduction ratio of the reduced materials. Here, the unit of x is %, the unit of y is %, and the unit of 103.9 is %.

It is preferable that the combusting temperature in the melter-gasifier is decreased as the injecting amount of the fine carbonaceous materials is increased in the step of injecting the fine carbonaceous materials into the coal packed bed.

It is preferable that the combusting temperature in the melter-gasifier is substantially decreased by 200° C. whenever the amount of fine carbonaceous materials increases by 50 kg per 1 ton of molten irons.

The mixtures containing iron ores may be fluidized through multi-stage reduction reactors connected in order while converting the mixtures containing iron ores into the reduced materials in the step of reducing the mixtures containing iron ores in the reduction reactor and converting the mixtures containing iron ores into the reduced materials.

The above step of converting into the reduced materials may further include a step of compacting the reduced materials before the reduced materials are charged into the melter-gasifier.

The reduction reactor may be a fluidized bed reactor in the step of reducing the mixtures containing iron ores in the reduction reactor and converting the mixtures containing iron ores into the reduced materials.

The reduction reactor may be a packed bed reactor in the step of reducing the mixtures containing iron ores in the reduction reactor and converting the mixtures containing iron ores into the reduced materials.

It is preferable that the length of a raceway formed ahead of the tuyere is in the range from 0.7 m to 1.0 m in the step of injecting oxygen and the fine carbonaceous materials into the coal packed bed through a tuyere installed in the melter-gasifier;

An apparatus for manufacturing molten irons according to the present invention includes a reduction reactor for reducing mixtures containing iron ores and converting the mixtures containing iron ores into reduced materials, a coal supplying device for supplying lumped carbonaceous materials containing volatile matters as a heating source for melting the reduced materials, a melter-gasifier having a dome-shaped upper portion into which the reduced materials are charged and being connected to the reduction reactor, the melter-gasifier into which the lumped carbonaceous materials are charged and being connected to the coal supplying device, the melter-gasifier into which oxygen and fine carbonaceous materials containing volatile matters are injected through the tuyeres installed in a side of the melter-gasifier, a fine carbonaceous materials supplying device for supplying the fine carbonaceous materials, and a reducing gas supplying line for supplying the reducing gas in the melter-gasifier made from the volatile matters contained both in the lumped carbonaceous materials and the fine carbonaceous materials to the reduction reactor.

It is preferable that the fine carbonaceous materials contain volatile matters in the range from 8.0 wt % to 35.0 wt % and the volatile matters contain carbon and hydrogen.

It is preferable that a free swelling index of the fine carbonaceous materials is not more than 6.0.

The lumped carbonaceous materials may contain volatile matters in the range from 20.0 wt % to 35.0 wt % and the volatile matters may contain carbon and hydrogen.

It is preferable that a grain size of the lumped carbonaceous materials is in the range from 8 mm to 35 mm.

The fine carbonaceous materials supplying device may include a raw coals storage bin for storing raw coals, a mill for crushing the raw coals and manufacturing the fine carbonaceous materials and being connected to the raw coals storage bin, a fine carbonaceous materials storage bin for storing the crushed and manufactured fine carbonaceous materials and being connected to the mill, a pressure balancing supplying device for supplying a suitable amount of the fine carbonaceous materials from the fine carbonaceous materials storage bin to the melter-gasifier, a divider installed above the melter-gasifier for controlling a supplying amount of the fine carbonaceous materials, and a fine carbonaceous materials supplying line for supplying the fine carboneous materials into the tuyeres and being connected to the pressure balancing supplying device.

A plurality of dividers may be connected to the tuyeres, respectively, and the fine carbonaceous materials are equally supplied to each divider and then are respectively supplied to the tuyeres.

The apparatus for manufacturing molten irons may further include a mixing chamber installed near the tuyeres, an adding gas supplying line for supplying an adding gas to the mixing chamber and being connected to the mixing chamber, and a fine carbonaceous materials injecting line for injecting the fine carbonaceous materials and being connected between the mixing chamber and the tuyeres. The mixing chamber may be connected to the fine carbonaceous materials supplying device, and the fine carbonaceous materials supplied from the fine carbonaceous materials supplying device are injected into the melter-gasifier through the fine carbonaceous materials injecting line by using the adding gas.

The fine carbonaceous materials may be supplied to the mixing chamber with a transferring gas.

It is preferable that a flow rate of the fine carbonaceous materials discharged from the fine carbonaceous materials injecting line is controlled in the range from 40 m/sec to 70 m/sec by controlling an amount of adding gas supplied from the adding gas supplying line.

The combustible gas may be used as the adding gas.

It is preferable that the adding gas supplying line makes an angle in the range from 30 degrees to 90 degrees with the fine carbonaceous materials injecting line.

The coal supplying device may include an apparatus for manufacturing coal briquettes for manufacturing and supplying coal briquettes by molding the fine coals.

The apparatus for manufacturing coal briquettes may include a dryer for drying the fine coals, a dust separator for collecting dust generated in the dryer, a mixer connected to the dryer and adding a binder to the dried fine coals and mixing them together, and a couple of rolls connected to the mixer and manufacturing coal briquettes by molding the fine coals to which the binder is added and mixed together.

The dust separator may supply the collected dust as the fine carbonaceous materials to the fine carbonaceous materials supplying device.

The fine carbonaceous materials supplying device may be connected to the apparatus for manufacturing coal briquettes and the fine carbonaceous materials are supplied from the fine carbonaceous materials supplying device.

The reduction reactors may be multi-stage fluidized bed reactors connected in order.

The apparatus for manufacturing molten irons may further include an apparatus for manufacturing compacted irons for compacting the reduced materials and being connected to the reduction reactor and wherein the compacted irons manufactured in the apparatus for manufacturing compacted irons are supplied to the melter-gasifier.

The reduction reactor may be a packed bed reactor.

It is preferable that the length of a raceway formed ahead of the tuyere is in the range from 0.7 to 1.0 m.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Embodiments of the present invention will be explained below with reference to FIGS. 1 to 6. The embodiments of the present invention are merely to illustrate the present invention and the present invention is not limited thereto.

Figure 1:
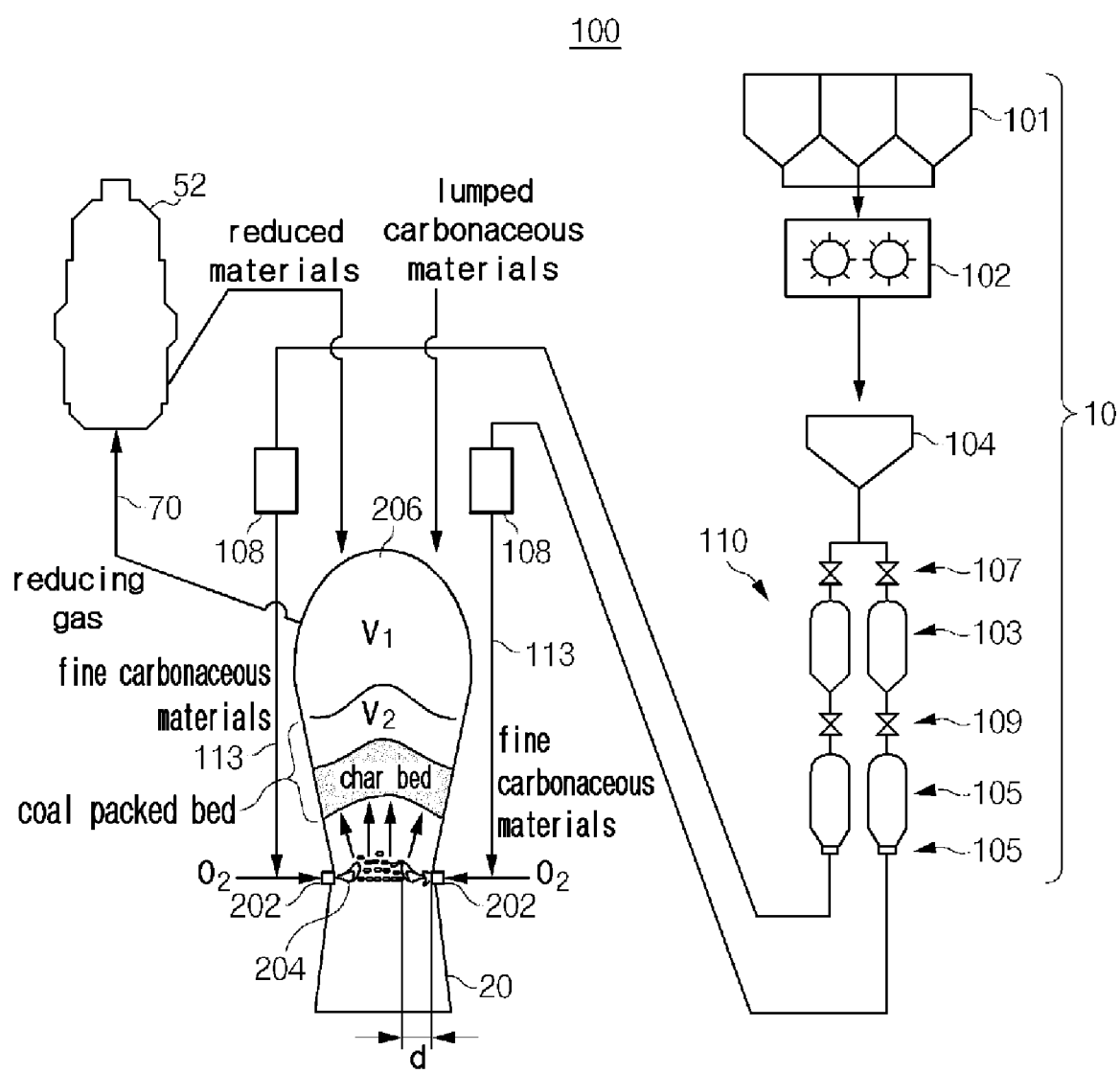
FIG. 1 is a schematic perspective view of the apparatus for manufacturing molten irons according to a first embodiment of the present invention.

FIG. 1 schematically shows a process of injecting fine carbonaceous materials into a melter-gasifier 20. Here, carbonaceous materials mean materials containing carbon. The fine carbonaceous materials are injected with oxygen into the melter-gasifier 20 through tuyeres 202.

The upper portion 206 of the melter-gasifier 20 is dome-shaped, which is different from that of a blast furnace. The dome-shaped upper portion 206 is located above a coal packed bed of the melter-gasifier 20. The volume $V_2$ of the coal packed bed formed in the melter-gasifier 20 is formed to be smaller than the volume $V_1$ of the dome-shaped upper portion 206. Due to such a structure, the dome-shaped upper portion 206 decreases a flow rate of gas. Therefore, dust contained in the reduced materials charged into the melter-gasifier 20 and dust generated due to a rapid rising temperature of the coals in the coal packed bed are prevented from discharging out of the melter-gasifier 20.

Since the coals are directly used in the melter-gasifier 20, the amount of generated gas is irregularly varied. The dome-shaped upper portion 206 absorbs a varying pressure in the melter-gasifier 20 caused by the above circumstance. For this, the dome-shaped upper portion 206 of the melter-gasifier 20 is pressurized and maintained, and is maintained at a hot temperature in the range from 900° C. to 1100° C. Since the dome-shaped upper portion 206 is maintained at a hot temperature, tar components generated during a process of removing volatile matters of coals can be completely decomposed.

The reduced irons are converted into molten irons and molten slags while falling in the coal packed bed. Therefore, a char bed containing a large amount of char is formed below the coal packed bed. Here, char means a material after the coal is gasified. As shown in FIG. 1, the coal packed bed is defined to contain a char bed for convenience. The chars are burned by oxygen injected through the tuyeres 202 and are destroyed. Therefore, the balance between the volume of mixtures containing coals, reduced irons, and additives, and that of chars which are burned and destroyed in the lower portion of the melter-gasifier should be set in order to uniformly maintain the volume of the coal packed bed. For this, it is preferable that the structure of the coal packed bed has a large upper portion and a small lower portion. That is, it is preferable that the upper portion of the coal packed bed is large while the lower portion is small. According to the present invention, the melter-gasifier 20 is pressurized since extra reducing gas is generated by injecting fine carbonaceous materials.

Since the blast furnace has a structure which is completely different from that of the above described melter-gasifier 20, there is a big difference in the mechanism of manufacturing molten irons. The structure of a blast furnace has a small upper portion and a large lower portion. That is, the upper portion of the blast furnace is small while the lower portion is large. Therefore, the structure of the blast furnace is essentially different from that of the melter-gasifier 20 for generating a large amount of reducing gas.

In the blast furnace method, molten irons are manufactured by using sintered ores and cokes having enhanced strength by previously removing volatile matters. Therefore, since gas is not generated from the volatile matters, the internal portion of the blast furnace is maintained at a pressure not more than 2 atmospheric pressures. Since gas is not generated from the volatile matters, the amount of the reducing gas is not increased and only heat is supplied instead of cokes even though pulverized coals are injected into the blast furnace. In addition, the heat exchange between gas and solids in the cokes and sintered ores packed up to the upper portion of the blast furnace is sufficiently carried out. Therefore, the temperature of gas discharged from the upper portion of the blast furnace is maintained at not more than 200° C.

According to the present invention, volatile matters contained in fine carbonaceous materials and carbonaceous materials contained in fixed carbon are burned by injecting the fine carbonaceous materials. A combustion heat, which is generated when carbonaceous materials are burned, is used in manufacturing molten irons. In addition, a large amount of hot reducing gases containing only CO and $H_2$ are generated by hot burning fine carbonaceous materials. The large amount of hot reducing gases passes through the coal packed bed formed in the melter-gasifier 20 and then is supplied to the dome portion of the melter-gasifier 20. Therefore, the consuming energy for pyrolyzing lumped carbonaceous materials which are charged into the melter-gasifier 20 is supplied. Furthermore, a quantity of the lumped carbonaceous materials, which are charged into the melter-gasifier 20, is decreased by injecting the fine carbonaceous materials. According to the present invention, which is different from a pulverized coal injection process, fine carbonaceous materials containing a large amount of volatile matters are injected into the melter-gasifier 20 and then increase an amount of reducing gas.

As the fine carbonaceous materials are injected, an amount of extra oxygen supplied through a dust burner or an oxygen burner installed in the dome portion of the melter-gasifier can be decreased. Therefore, a burning amount of the reducing gas and an amount of depyrolyzed hydrocarbon in the dome portion are decreased, too.

As shown in FIG. 1, the lumped carbonaceous materials are charged into the upper portion of the melter-gasifier 20, and thereby a coal packed bed is formed therein. The lumped carbonaceous materials are also used as a heating source for melting reduced materials. The lumped carbonaceous materials may include lumped coals or coal briquettes.

According to the present invention, lumped carbonaceous materials containing 20.0~35.0 wt % of volatile matters are used. Here, the volatile matters include carbon and hydrogen. If the amount of volatile matters contained in the lumped carbonaceous materials is less than 20.0 wt %, there is a problem in that an amount of reducing gas generated in the melter-gasifier 20 is considerably less than that consumed for reduction of the reduced materials in the reduction reactor 52. In addition, if the amount of volatile matters contained in the lumped carbonaceous materials is more than 35.0 wt %, it is difficult to use them for manufacturing molten irons. General coals, such as semi-bituminous coals, are used as the lumped carbonaceous materials. The lumped carbonaceous materials can be obtained by dividing raw coals and it is preferable that the grain size thereof is in the range from 8 mm to 35 mm. If the grain size of the lumped carbonaceous materials is less than 8 mm, it is impossible to secure permeability in the melter-gasifier. In addition, if lumped carbonaceous materials of which the grain size is more than 35 mm are manufactured, yield efficiency is deteriorated.

Meanwhile, the mixture containing iron ores is reduced in the reduction reactor 52. The reduced materials are charged into the melter-gasifier and molten irons are manufactured.

The reducing gas is manufactured by using volatile matters contained in fine carbonaceous materials in addition to volatile matters contained in the lumped carbonaceous materials. Therefore, a reducing gas having improved reduction power can be supplied to the reduction reactor, and thereby the reduction ratio of the reduced materials can be considerably increased. Subsequently, the fuel ratio of the melter-gasifier 20 can go down considerably.

The fine carbonaceous materials are transferred to a front end of the tuyere by air and are injected into the tuyere. Therefore, an amount of moisture contained in the fine carbonaceous materials is controlled to be not more than 2.0 wt % in order to be suitable for being transferred by air. It is preferable that the fine carbonaceous materials contain volatile matters in the range from 8.0 wt % to 35.0 wt %. Here, the volatile matters contain carbon and hydrogen. If the amount of volatile matters contained in the fine carbonaceous materials is less than 8.0 wt %, the generating amount of the extra reducing gas due to the fine carbonaceous materials is not significant. In addition, the fine carbonaceous materials are dried while being transferred by air, and so it is difficult for a content of the volatile matters to be more than 35.0 wt %. Semi-anthracite coals or semi-bituminous coals, of which the content of volatile matters is not more than 35.0 wt %, can be used as the fine carbonaceous materials.

Meanwhile, the grain size of the fine carbonaceous materials is limited during injection of the fine carbonaceous materials in order for the fine carbonaceous materials injecting line not to be blocked. The fine carbonaceous materials are crushed in order for the grain size thereof to be not more than 3.0 mm. Then, the carbonaceous materials can be used. In addition, fine carbonaceous materials, of which the free swelling index is not more than 6.0, are used in order for the tuyere not to be blocked by the fine carbonaceous materials. As the free swelling index grows high, a coking power is increased, and thereby adhesion of the fine carbonaceous materials is serious. Since the fine carbonaceous materials of which the free swelling index is not less than 6.0 are stuck to each other in a drying process, it is difficult to crush them into the grain size suitable for being transferred by air. In addition, the fine carbonaceous materials supplying line can be blocked by sticking while being transferred by air.

Oxygen is supplied to the melter-gasifier 20 through the tuyeres 202 installed in a lower portion thereof and the coal packed bed is heated to a hot temperature by using combustion heat of the char by the oxygen. The tuyeres 202 are connected to the fine carbonaceous materials supplying line 113, and pulverized coals are supplied to the tuyeres 202 from the fine carbonaceous materials supplying device 10. The pulverized coals with the oxygen are injected into the coal packed bed through the tuyeres 202.

In this case, the length d of a raceway 204 ahead of each tuyere 202 is in the range from 0.7 m to 1.0 m. If the length d of the raceway 204 is less than 0.7 m, there is a possibility that a nose of the tuyere 202 gets damaged since the length of the raceway 204 is too short. In addition, if the length d of the raceway 204 is more than 1.0 m, chars are broken due to an increased flow rate. Since the oxygen is supplied through the tuyere 202, the length d of the raceway 204 is relatively short.

In a method for manufacturing molten irons directly using reduced materials containing iron ores and carbonaceous materials, a plurality of advantages can be obtained by injecting fine carbonaceous materials with oxygen into the coal packed bed. That is, when fine carbonaceous materials are injected into the melter-gasifier 20 through the tuyere 202, the fine carbonaceous materials are burned and volatile matters contained therein are also burned. Therefore, utilization efficiency of the carbon is enhanced and the amount of reducing gas is increased, thereby the reduction ratio of the reduced materials containing iron ores is enhanced. Therefore, fuel ratio can be reduced. In addition, since a generation of $CH_4$ gas can be prevented by complete combustion, an oxidization ratio can be improved even though an amount of $CH_4$ gas is decreased.

According to the present invention, reducing gas having a decreased oxidation ratio can be supplied from the melter-gasifier 20 to the reduction reactors 52 by injecting fine carbonaceous materials, thereby enhancing a reduction ratio of the reduced materials. That is, when the fine carbonaceous materials are injected into the melter-gasifier 20 through the tuyere 202 installed therein, the fine carbonaceous materials directly come in contact with the hot raceway in the melter-gasifier 20 and are burned. Therefore, volatile matters containing fine carbonaceous materials are completely decomposed into carbon (C), hydrogen ($H_2$), and oxygen ($O_2$), and thereby the generated amount of $CH_4$ due to incomplete burning is not large. In addition, a large amount of CO gas and $H_2$ gas for reduction is generated by the reaction such as in the following Chemical Formula 1.

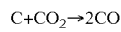

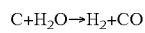  [Chemical Formula 1]

Therefore, a reducing gas having a decreased oxidation ratio can be supplied from the melter-gasifier to the reduction reactors due to a large amount of CO gas and $H_2$ gas, thereby reducing the mixture containing iron ores and then converting it into the reduced materials. Since the mixture containing iron ores can include additives, it can help the reduced materials to be sintered.

Meanwhile, when fine carbonaceous materials are injected into the melter-gasifier 20, a combustion temperature in the melter-gasifier 20 can be decreased since volatile matters contained in the carbonaceous materials are pyrolyzed. By using this method, there is an advantage that not only the furnace heat of the melter-gasifier can be easily controlled but also a Si content of the molten irons can be reduced.

In the apparatus for manufacturing molten irons 100 shown in FIG. 1, the fine carbonaceous materials, which are injected with oxygen, can be manufactured by going through the following processes. The fine carbonaceous materials are manufactured by crushing raw coals collected from a producing district and the crushed fine carbonaceous materials are transferred to the installation for injecting oxygen. Next, the fine carbonaceous materials are mixed with oxygen and are injected into the coal packed bed of the melter-gasifier 20. The injection of the fine carbonaceous materials is carried out by the fine carbonaceous materials supplying device 10.

The structure of the fine carbonaceous materials supplying device 10 shown in FIG. 1 is merely to illustrate the present invention, and the present invention is not limited thereto. Therefore, the fine carbonaceous materials can be supplied to the melter-gasifier 20 using other fine carbonaceous materials supplying devices having a modified structure. The structure of the fine carbonaceous materials supplying device 10 will be explained in more detail below.

The fine carbonaceous materials supplying device 10 includes a raw coals storage bin 101, a mill 102, a fine carbonaceous materials storage bin 104, a pressure balancing supplying device 110, a divider 108, and a fine carbonaceous materials supplying line 113. Besides, the fine carbonaceous materials supplying device 10 can also include other devices, if necessary.

The raw coals storage bin 101 stores raw coals. A plurality of raw coals storage bins 101 can be installed. In this case, coals of various types of which producing districts are different from each other can be stored in each raw coals storage bin 101, respectively, and can be used.

The mill 102 is connected to the raw coals storage bin 101 and crushes the raw coals and manufactures the fine carbonaceous materials. The grain size of the crushed fine carbonaceous materials is preferably not more than 3 mm. If the grain size of the fine carbonaceous materials is more than 3 mm the tuyere 202 may be dangerously blocked during injection of the fine carbonaceous materials. The fine carbonaceous materials storage bin 104 is connected to the mill 102 and stores the crushed and manufactured fine carbonaceous materials.

The pressure balancing supplying device 110 supplies a suitable amount of fine carbonaceous materials from the fine carbonaceous materials storage bin 104 to the melter-gasifier 20. For this, the pressure balancing supplying device 110 includes a uniformly pressurizing vessel 103, a pressurizing and discharging vessel 105, isolation valves 107 and 109, and a suitable amount supplying device. The uniformly pressurizing vessel 103 and the pressuring and discharging vessel 105 are located up and down, and control a supplying amount of the fine carbonaceous materials which are crushed and manufactured by using the isolation valves 107 and 109.

Considering that the pressure in the melter-gasifier 20 is high, the divider 108 is located above the upper portion of the melter-gasifier 20. Therefore, it is possible to sufficiently secure the pressure in the divider 108 for injecting the fine carbonaceous materials into the melter-gasifier 20 while the supplying amount of the fine carbonaceous materials is controlled. The fine carbonaceous materials supplying line 113 is connected to the pressure balancing supplying device 110 through the divider 108 and supplies the fine carbonaceous materials to the tuyeres 202.

A plurality of tuyeres 202 and a plurality of dividers 108 can be installed. A plurality of dividers 108 are connected to a plurality of tuyeres 202, respectively, and the fine carbonaceous materials are uniformly supplied to each divider 108 and are supplied to the tuyeres 202, respectively. The pressure balancing supplying device 110 uniformly supplies the fine carbonaceous materials to the divider 108.

Since the detailed internal structure of the above described devices can be understood by those skilled in the art in the technical field of the present invention, the detailed explanation thereof will be omitted.

In addition, according to the present invention, the raw coals are divided and are used as pulverized coals which are injected into the melter-gasifier 20. The above second embodiment of the present invention will be explained in more detail with reference to FIG. 2.

Figure 2:
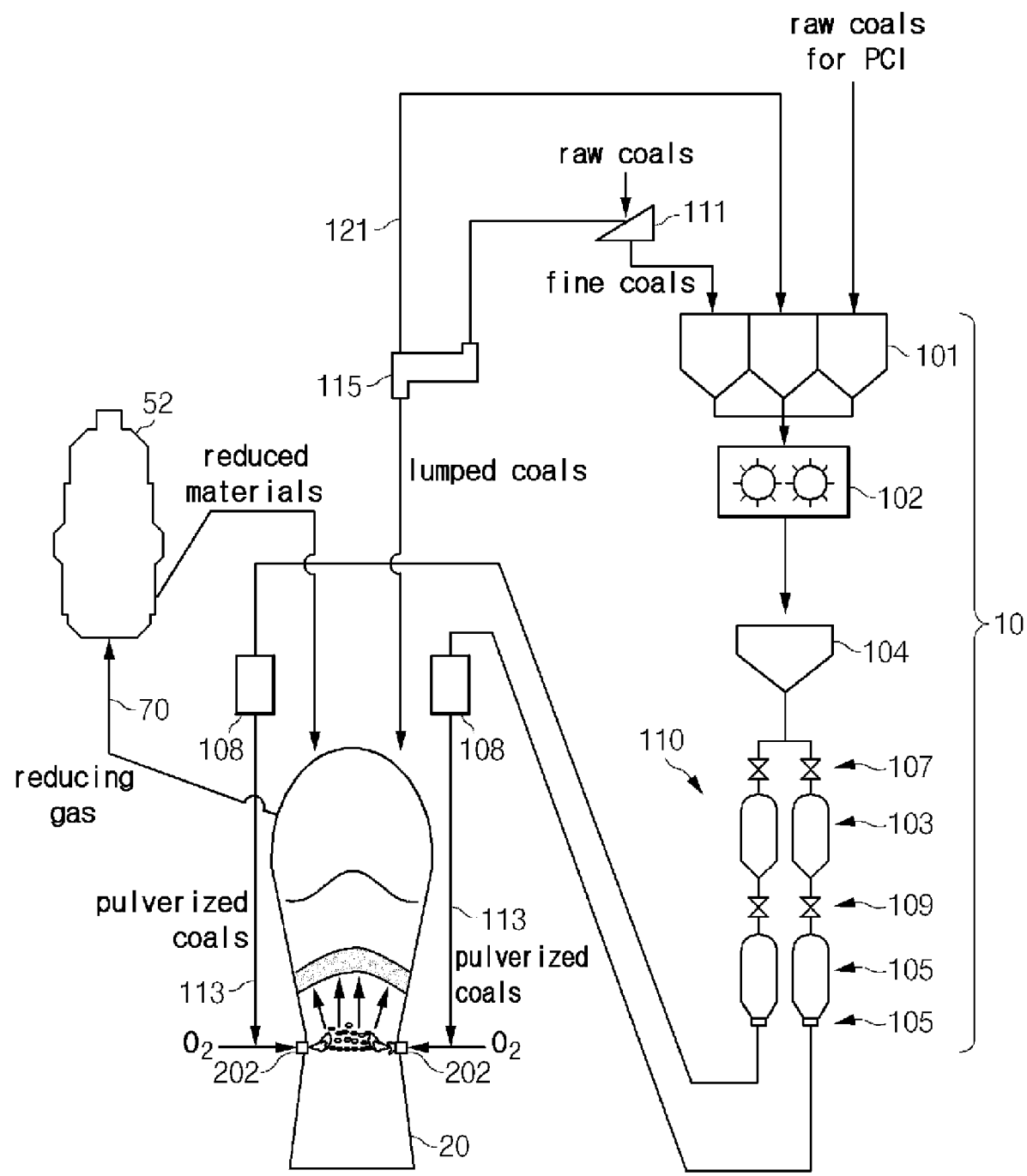
FIG. 2 is a schematic perspective view of the apparatus for manufacturing molten irons according to a second embodiment of the present invention.

Since the structure of the apparatus for manufacturing molten irons 200 according to the second embodiment of the present invention shown in FIG. 2 is similar to that of the apparatus for manufacturing molten irons according to the first embodiment of the present invention, the same elements are referred to with the same reference numerals and a detailed explanation thereof will be omitted.

The raw coals are divided into lumped coals and fine coals by a screen 111. The raw coals having a grain size of not less than 8 mm are divided into lumped coals and the raw coals having a grain size of less than 8 mm are divided into fine coals. The above grain size standard is merely to illustrate the present invention and the present invention is not limited thereto. Therefore, the raw coals can be divided based on another grain size standard.

The lumped coals come in contact with a hot gas and are dried in the dryer 115. The dried lumped coals are charged into the melter-gasifier 20. The dryer 115 dries the lumped coals using heat recovery which is generated from the melter-gasifier 20. Besides, the lumped coals can be dried using other methods.

The fine coals are collected when the lumped coals come in contact with the hot gas in the dryer 115 and are then transferred to the raw coals storage bin 101 via a fine coals transferring line 121. Therefore, collected fine coals can be injected into the melter-gasifier 20 as the pulverized coals. The fine coals divided from the raw coals can be used as the pulverized coals. Therefore, the apparatus for manufacturing molten irons 200 can use the fine coals generated from the raw coals for pulverized coal injection (PCI) beside the raw coals, and thereby there is an advantage that utilization efficiency of the fine coals can be maximized.

The reducing gas generated from the melter-gasifier 20 is supplied to the packed bed reactor 52 via a reducing gas supplying line 70. The reduced materials reduced in the packed bed reactor 52 are supplied to the melter-gasifier 20 and are melted therein.

Figure 3:
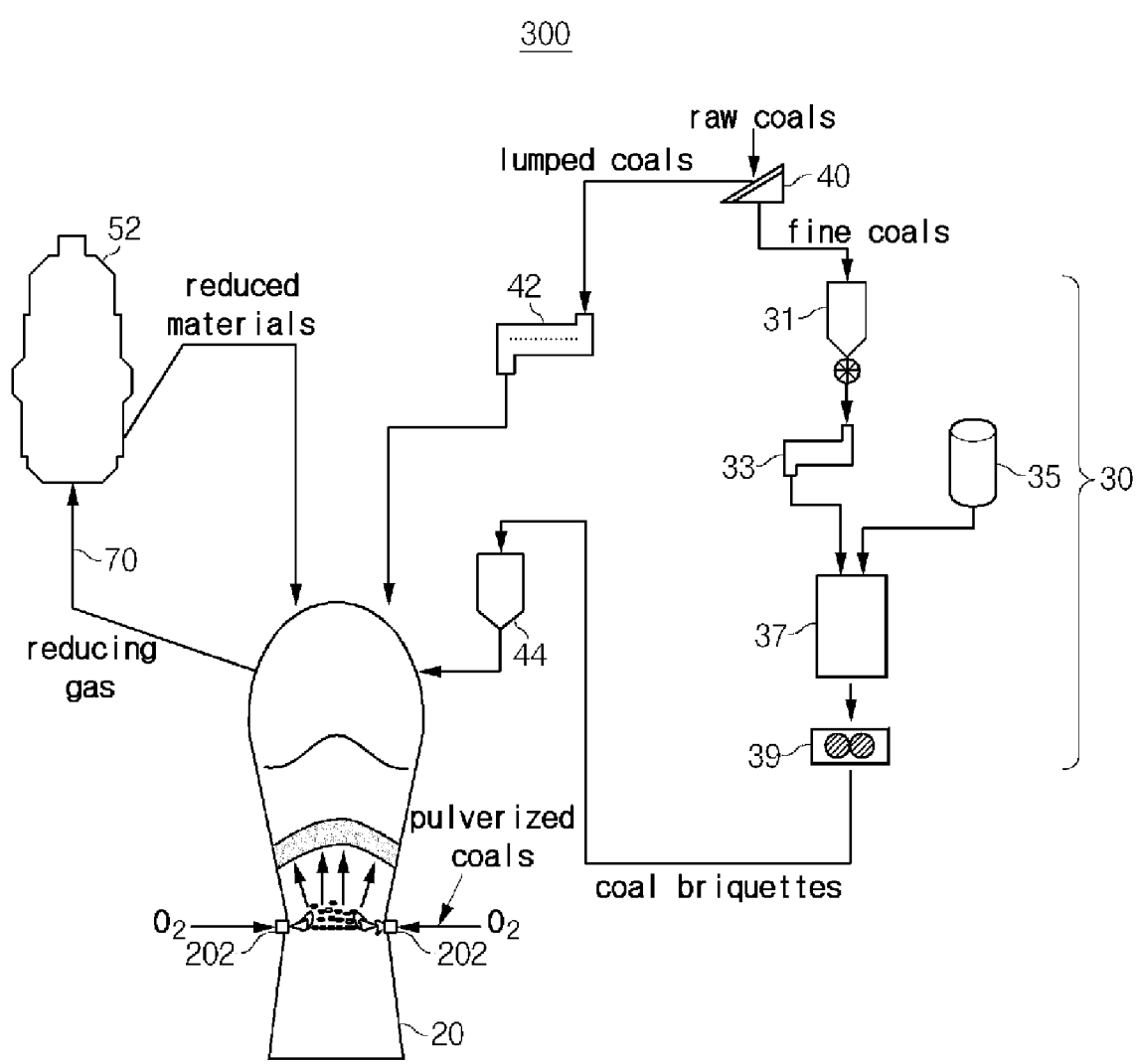
FIG. 3 is a schematic perspective view of the apparatus for manufacturing molten irons according to a third embodiment of the present invention.

An apparatus for manufacturing molten irons 300 according to a third embodiment of the present invention shown in FIG. 3 includes an apparatus for manufacturing coal briquettes 30. Coal briquettes manufactured in the apparatus for manufacturing coal briquettes 30 are charged into the melter-gasifier 20. Since the other portions of the apparatus for manufacturing molten irons 300, except the apparatus for manufacturing coal briquettes 30, are similar to those of the apparatus for manufacturing molten irons 100 according to the first embodiment of the present invention, the detailed explanation thereof will be omitted and the same elements are referred to with the same reference numerals.

The apparatus for manufacturing molten irons 300 supplies fine coals to the melter-gasifier 20 using the fine carbonaceous materials supplying device shown in FIG. 1. The fine carbonaceous materials supplying device is omitted in FIG. 3 for convenience.

The apparatus for manufacturing coal briquettes 30 molds fine coals and then manufactures coal briquettes as a heating source in order to melt the reduced materials. The raw coals are divided into lumped coals having a large grain size and fine coals having a small grain size by a selector 40. The lumped coals are directly charged into the melter-gasifier 20 after they are dried in the lumped coals dryer 42. The fine coals are manufactured into coal briquettes in order to secure permeability in the melter-gasifier 20 and are charged into the melter-gasifier 20. Here, raw coals are divided into the lumped coals having a grain size more than 8 mm and fine coals having a grain size not more than 8 mm based on the grain size standard of 8 mm. The above grain size standard is merely to illustrate the present invention and the present invention is not limited thereto. Therefore, it is possible for the lumped coals and fine coals to be divided using other grain size standards.

Lumped carbonaceous materials including the lumped coals and the coal briquettes manufactured by molding the fine coals are prepared. The lumped carbonaceous materials are charged into the melter-gasifier 20 and the coal packed bed is formed. Here, a step of preparing the lumped carbonaceous materials includes a step of dividing raw coals into lumped coals and fine coals and a step of manufacturing coal briquettes by molding the fine coals.

The step of manufacturing the coal briquettes includes a step of dividing raw coals into lumped coals and fine coals, a step of drying the fine coals, a step of adding a binder to the fine coals and mixing together, and a step of molding the fine coals in which the binder is added and mixed together and manufacturing the coal briquettes.

In order to realize the above process, the apparatus for manufacturing coal briquettes 30 may further include a dryer 33, a mixer 37, and a couple of rolls 39. Besides, it may further include a fine coals storage bin 31, a binder storage bin 35, a coal briquettes storage bin 44, and so on.

The dryer 33 dries the fine coals. The mixer 37 is connected to the dryer 33 and mixes a binder, which is supplied from the binder storage bin 35, and the dried fine coals together. The couple of rolls 39 are connected to the mixer 37 and manufacture coal briquettes by molding the fine coals with which the binder is mixed together.

The fine coals storage bin 31 temporarily stores the fine coals and the binder storage bin 35 stores a binder such as molasses. In addition, the coal briquettes storage bin 44 temporarily stores the manufactured coal briquettes. Besides, other devices, which are necessary for manufacturing coal briquettes, such as a dust separator, can also be included if necessary.

Particularly, according to the present invention, molten irons can be manufactured directly using the fine raw coals and fine iron ores. The method for manufacturing molten irons will be explained in detail with reference to FIG. 4 below.

Figure 4:
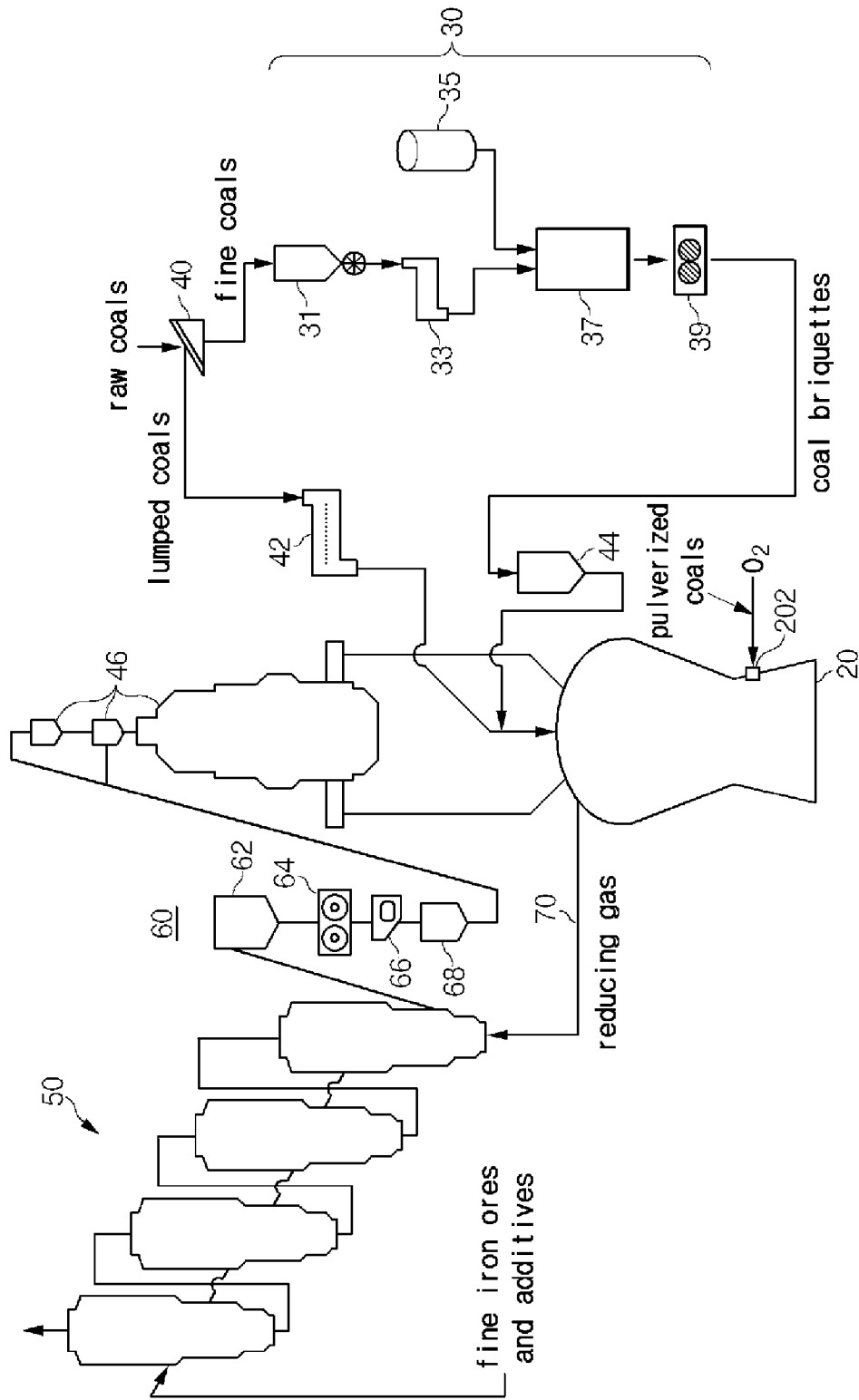
FIG. 4 is a schematic perspective view of an apparatus for manufacturing compacted irons according to a fourth embodiment of the present invention.

As shown in FIG. 4, molten irons can be manufactured directly using fine raw coals and fine iron ores. FIG. 4 shows an apparatus for manufacturing molten irons 400 according to a fourth embodiment of the present invention for carrying out the above described process. The structure of the apparatus for manufacturing molten irons 400 shown in FIG. 4 is merely to illustrate the present invention and the present invention is not limited thereto. Therefore, it can be modified in other structures and other devices can be included.

Since the structure of the apparatus for manufacturing molten irons 400 is similar to the structure of the apparatus for manufacturing molten irons shown in FIG. 3, the same elements are referred to with the same reference numerals and the detailed explanation thereof will be omitted.

The apparatus for manufacturing molten irons 400 mainly include a fluidized bed reactor 50 as a reduction reactor, an apparatus for manufacturing coal briquettes 30, a melter-gasifier 20, a fine carbonaceous materials supplying device 10 (shown in FIG. 1) and a reducing gas supplying line 70. Besides, the apparatus for manufacturing molten irons 400 may further include an apparatus for manufacturing compacted irons 60 connected between the fluidized bed reactor 50 and the melter-gasifier 20. In addition, the apparatus for manufacturing molten irons 400 can include other devices necessary to manufacture molten irons.

The multi-stage fluidized bed reactors in which fluidized beds are formed are sequentially connected to each other in order to reduce the mixtures containing iron ores and convert them into reduced materials. The reducing gas, which is discharged from the coal packed bed of the melter-gasifier 20, is supplied to each fluidized bed reactor via a reducing gas supplying line 70. The reducing gas enters into the fluidized bed reactors and flows therein, thereby iron ores and additives pass through them and are converted into reduced materials. The reduced materials may be compacted by the apparatus for manufacturing compacted irons 60. Such manufactured reduced materials are charged into the melter-gasifier 20 and are manufactured into molten irons.

The apparatus for manufacturing compacted irons 60 compacts reduced materials and then manufactures compacted reduced materials in order to secure permeability and to prevent them from elutriating. The apparatus for manufacturing compacted irons 60 includes a charging hopper 62, a couple of rolls 64, a crusher 66, and a reduced materials storage bin 68. Besides, the apparatus for manufacturing compacted irons 60 may include other devices if necessary.

The charging hopper 62 stores reduced materials which are reduced from the mixture containing iron ores. The couple of rolls 64 presses the reduced materials and manufactures compacted reduced materials. The crusher 66 crushes the compacted reduced materials into a suitable size. The reduced materials storage bin 68 temporarily stores the crushed reduced materials.

A hot uniformly pressurizing device 46 is located between the apparatus for manufacturing compacted irons 60 and the melter-gasifier 20. The hot uniformly pressurizing device 46 is installed above the melter-gasifier 20 in order to control pressure. Although the inside of the melter-gasifier 20 is at a high pressure, the crushed reduced materials can be easily charged into the melter-gasifier 20 since the hot uniformly pressurizing device 46 uniformly controls the pressure.

Figure 5:
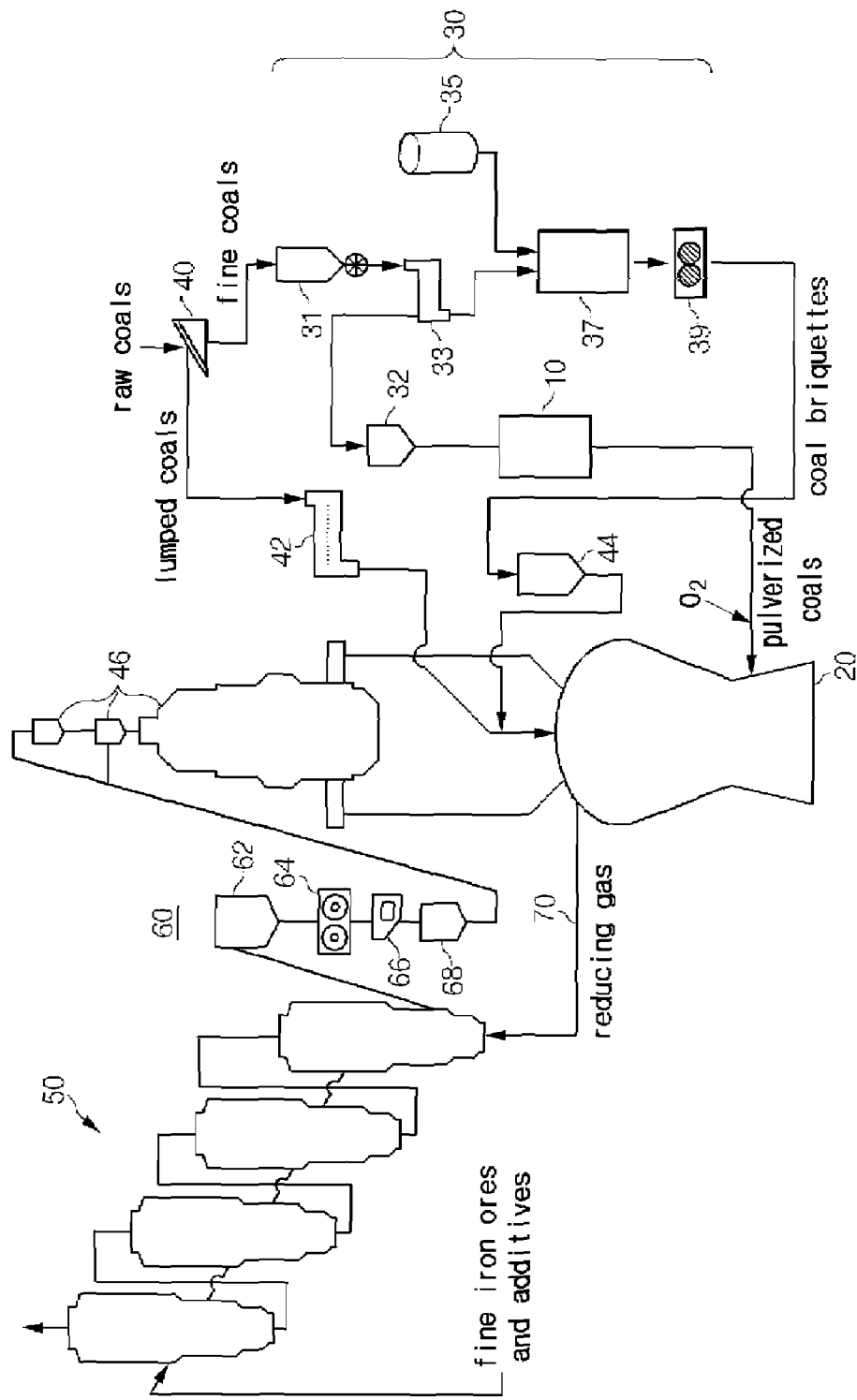
FIG. 5 is a schematic perspective view of an apparatus for manufacturing compacted irons according to a fifth embodiment of the present invention.

In the apparatus for manufacturing molten irons 500 according to a fifth embodiment of the present invention shown in FIG. 5, the fine coals generated during manufacturing of the coal briquettes can be injected into the melter-gasifier 20. Since the structure of the apparatus for manufacturing molten irons 500 according to a fifth embodiment of the present invention is similar to the structure of the apparatus for manufacturing molten irons shown in FIG. 4, the same elements are referred to with the same reference numerals and the detailed explanation thereof will be omitted.

The apparatus for manufacturing coal briquettes 30 may include a dust separator 32 collecting dust generated in the dryer 33. The dust separator 32 is connected to the fine carbonaceous materials supplying device 10 and supplies fine coals thereto. The fine coals are injected with oxygen into the melter-gasifier 20 as pulverized coals. By using this method, the coals can be recycled. Therefore, not only is a fuel ratio minimized but also a losing amount of the coals caused by elutriation of the dust can be minimized.

A fine carbonaceous materials supplying device is installed near each tuyere 202 in order to inject fine carbonaceous materials in the first to fifth embodiments of the above present invention. The fine carbonaceous materials supplying device will be explained with reference to FIG. 6 below.

Figure 6:
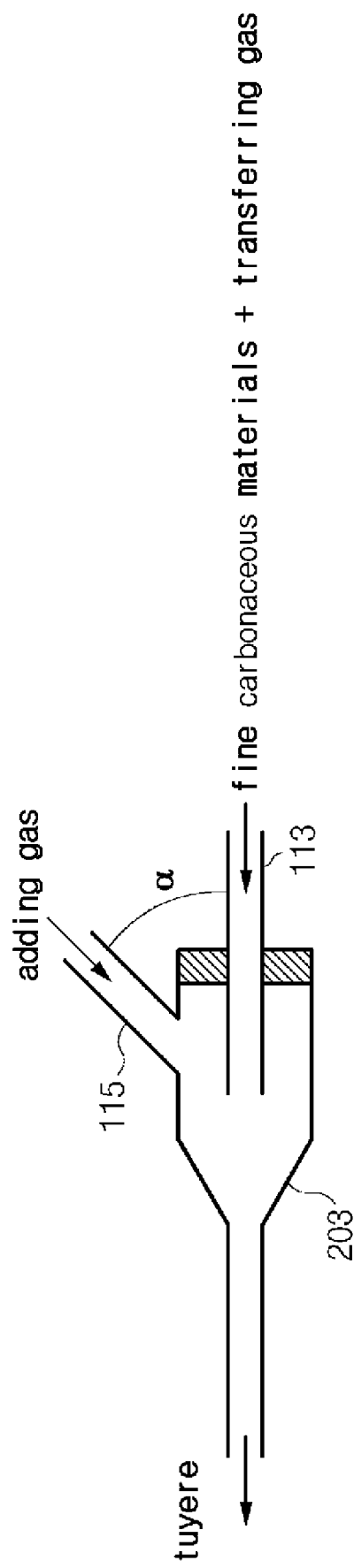
FIG. 6 is a conceptual view of injecting fine carbonaceous materials in an apparatus for manufacturing molten irons according to the first to fifth embodiments.

As shown in FIG. 6, a mixing chamber 203 is installed ahead of the tuyere. The fine carbonaceous materials and adding gas are mixed therein and are supplied to the tuyere. The adding gas supplying line 115 is connected to the mixing chamber 203 and a suitable amount of an adding gas is supplied. The fine carbonaceous materials are supplied from the fine carbonaceous materials supplying device via the fine carbonaceous materials injecting line 113. The fine carbonaceous materials are injected into the melter-gasifier using the adding gas.

When the fine carbonaceous materials are supplied to the tuyere with oxygen through a fine carbonaceous materials injecting line 113, the fine carbonaceous materials are quickly burned. Therefore, when a discharging flow rate of the fine carbonaceous materials from the fine carbonaceous materials injecting line 113 is slow, the raceway for burning the fine carbonaceous materials is formed near the fine carbonaceous materials injecting line 113. Since radiation heat is discharged from the raceway, a phenomenon that the fine carbonaceous materials injecting line 113 is melted and blocked due to the radiation heat occurs.

In order to prevent the above phenomenon, an adding gas is supplied by the adding gas supplying line 115. By using this method, the discharging flow rate of the fine carbonaceous materials from the fine carbonaceous materials injecting line 113 is quickened. Therefore, the raceway is formed away from the fine carbonaceous materials injecting line 113. In this case, it is preferable that the flow rate of the fine carbonaceous materials, which are discharged from the fine carbonaceous materials injecting line 113, is controlled in the range from 40 m/s to 70 m/s. If the flow rate of the fine carbonaceous materials is less than 40 m/s, it is difficult to inject the fine carbonaceous materials into the melter-gasifier of which pressure and the varying range of pressure are much larger than those of the blast furnace. In addition, if the flow rate of the fine carbonaceous materials is more than 70 m/s, there is a problem in that the combustion power of the fine carbonaceous materials is deteriorated.

A combustible gas may be used as the adding gas. The combustible gas may include hydrocarbon, hydrogen, and carbon monoxide. For example, liquid natural gas (LNG), cokes oven gas (COG), etc. can be used. In addition, off gas discharged from the apparatus for manufacturing molten irons according to the first to fifth embodiments of the present invention, from which $CO_2$ and $H_2O$ are partly removed, can also be used.

When a combustible gas is injected with oxygen through a tuyere, the combustion reaction of the following Chemical Formula 2 occurs.

$$(C, H_2) \text{ in combustible gas} + O_2 \rightarrow CO_2 + H_2O \quad \text{[Chemical Formula 2]}$$

Here, generated $CO_2 + H_2O$ are reacted with the fine carbonaceous materials and carbon elements in the coal packed bed formed near the tuyere. Therefore, an extra reducing gas generated in the tuyere by supplying combustible gas can be used. In addition, the heat generated by the predominant combustion of the reducing gas accelerates the rise of the temperature of the fine carbonaceous materials and then shortens the time for reaching the firing temperature of the fine carbonaceous materials. Therefore, it is possible to promote combustion of the fine carbonaceous materials.

In addition, the temperature of the raceway can be lowered by raising the temperature of the combustible gas and due to a heat for pyrolyzing hydrocarbon contained therein and the generating amount of the hot gas can be increased. Therefore, it is possible to uniformly control heat distribution around the tuyere in a much larger range.

The angle α formed between the adding gas supplying line 115 and the fine carbonaceous materials supplying line 113 is preferably in the range from 30 degrees to 90 degrees. If the angle α is less than 30 degrees, combustion may be difficult to occur since the flow rate is too quick due to the adding gas. On the contrary, if the angle α is more than 90 degrees, there is a problem in that the acceleration of the fine carbonaceous materials is not easy.

The present invention will be explained in more detail by the experimental examples of the present invention below. The experimental examples of the present invention are merely to illustrate the present invention, and the present invention is not limited thereto.

EXPERIMENTAL EXAMPLES

The experiment is carried out using an apparatus having the same structure of the apparatus for manufacturing molten irons according to the fourth embodiment of the present invention shown in FIG. 4 in order to observe a variation of a reduction ratio of a reducing gas as the fine carbonaceous materials are injected into the melter-gasifier and a variation of combustion temperature in the melter-gasifier.

Oxygen of 25° C. and 380 $Nm^3$/(t-p) (namely, oxygen of 380 $Nm^3$ per 1 ton of molten irons) was injected into the melter-gasifier. The amount of the fine carbonaceous materials was controlled to be varied by the fine carbonaceous materials supplying device. The results of a technical analysis and an element analysis of the fine carbonaceous materials used in the experimental examples of the present invention are shown in Table 1 and Table 2, respectively.

TABLE 1

| component | original moisture | ashes | volatile matters | fixed carbons |
|---|---|---|---|---|
| content (wt %) | 3.0 | 8.7 | 35.7 | 52.6 |

TABLE 2

| element | C | H | N | O | S |
|---|---|---|---|---|---|
| content (wt %) | 83.3 | 5.6 | 2.2 | 8.5 | 0.5 |

In Experimental example 1, the reducing amount of $CH_4$ gas was measured according to the injecting amount of the fine carbonaceous materials by injecting the fine carbonaceous materials. In Experimental example 2, the oxidization ratio of the reducing gas according to an amount of $CH_4$ gas in the melter-gasifier was measured. In Experimental example 3, the reduction ratio of the reduced materials, which are reduced to the reduced gas according to the variation of the oxidization ratio of the reducing gas, was measured. Finally, in Experimental example 4, the variation of combustion temperature in the melter-gasifier according to the variation of the injecting amount of the fine carbonaceous materials was measured. Experimental example 1 to Experimental example 4 will be explained in detail below.

Experimental Example 1

In order to observe the reducing amount of the $CH_4$ gas according to the increase of the injecting amount of the fine carbonaceous materials in the melter-gasifier, the reducing amount of $CH_4$ gas in the melter-gasifier was measured at each time of increasing the injecting amount of the fine carbonaceous materials by 50 kg/(p-t). The amount of $CH_4$ gas, which was 4.5 vol % in the melter-gasifier before injecting the fine carbonaceous materials, is gradually decreased as the injecting amount of the fine carbonaceous materials is increased. The reducing amount of $CH_4$ gas in the melter-gasifier according to the increase of injecting amount of the fine carbonaceous materials is shown in Table 3. Here, the reducing amount of $CH_4$ gas is the value when the amount of $CH_4$ gas at the time of measuring is subtracted from 4.5 vol %, which is the original amount of $CH_4$ gas.

TABLE 3

| | injecting amount of the fine carbonaceous materials (kg/p-t) | | | | |
|---|---|---|---|---|---|
| | 0 | 50 | 100 | 150 | 200 |
| reducing amount of $CH_4$ gas (vol %) | 0 | 0.50 | 0.10 | 0.15 | 0.20 |

Figure 7:
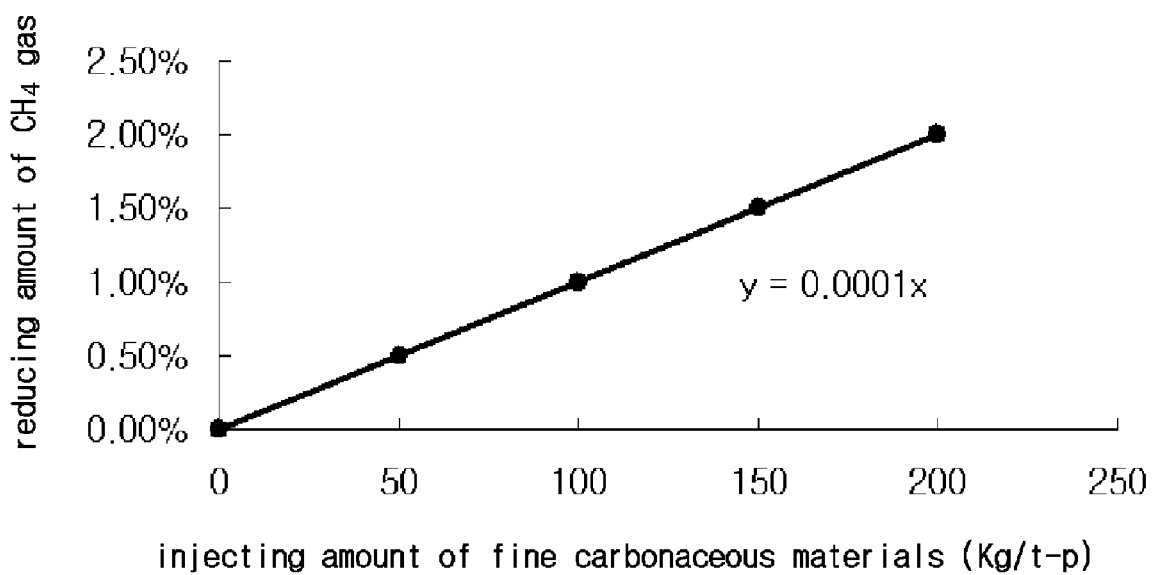
FIG. 7 is graph showing the relationship between an injecting amount of fine carbonaceous materials and a reducing amount of $CH_4$ gas according to a first Exemplary example of the present invention.

The data of Table 3 were diagramed in FIG. 7. In FIG. 7, the injecting amount of fine carbonaceous materials is shown on the x-axis and the reducing amount of $CH_4$ gas in the melter-gasifier is shown on the y-axis. As shown in FIG. 7, there exists a linear relationship between the injecting amount of fine carbonaceous materials and the reducing amount of $CH_4$. That is, the amount of $CH_4$ gas in the melter-gasifier is regularly decreased as the injecting amount of the fine carbonaceous materials is increased. As shown in FIG. 7, the injecting amount of fine carbonaceous materials (x) and the reducing amount of $CH_4$ gas in the melter-gasifier (y) substantially satisfy the following Formula 1. That is, they satisfy the condition that is the same as the following Formula 1 or is similar to it.

$$y=0.0001x \quad \text{[Formula 1]}$$

Here, the unit of x is kg/t-p, the unit of y is %, and the unit of 0.0001 is %/(kg/t-p).

With reference to Experimental example 1, the amount of $CH_4$ gas in the melter-gasifier was recognized to be able to be linearly decreased when the fine carbonaceous materials are injected into the melter-gasifier.

Experimental Example 2

In Experimental example 2 of the present invention, an oxidization ratio of the reducing gas according to the reducing amount of $CH_4$ gas in the melter-gasifier was measured. The measurement of the oxidization ratio is carried out by a spectroscope through which line spectrums can be observed. The method for measuring an oxidization ratio can be easily understood by those skilled in the art in the technical field of the present invention, and so a detailed explanation thereof will be omitted.

The oxidization ratio of the reducing gas was measured 67 times according to the variation of the amount of $CH_4$ gas in the melter-gasifier, and the results are shown in Table 4.

TABLE 4

| NO | amount of $CH_4$ gas (vol %) | oxidization ratio of reducing gas (%) |
|---|---|---|
| 1 | 2.117 | 3.125 |
| 2 | 2.215 | 2.307 |
| 3 | 2.608 | 4.944 |
| 4 | 2.704 | 4.711 |
| 5 | 2.830 | 3.935 |
| 6 | 2.845 | 4.605 |
| 7 | 2.872 | 3.672 |
| 8 | 2.884 | 5.889 |
| 9 | 2.944 | 5.263 |
| 10 | 3.112 | 6.506 |
| 11 | 3.176 | 5.162 |
| 12 | 3.196 | 7.533 |
| 13 | 3.207 | 8.269 |
| 14 | 3.245 | 6.212 |
| 15 | 3.283 | 6.070 |
| 16 | 3.316 | 7.330 |
| 17 | 3.340 | 7.438 |
| 18 | 3.372 | 4.645 |
| 19 | 3.386 | 6.373 |
| 20 | 3.405 | 6.058 |
| 21 | 3.408 | 8.000 |
| 22 | 3.418 | 6.871 |
| 23 | 3.422 | 6.780 |
| 24 | 3.437 | 6.698 |
| 25 | 3.441 | 8.035 |
| 26 | 3.495 | 6.590 |
| 27 | 3.497 | 8.129 |
| 28 | 3.508 | 7.119 |
| 29 | 3.552 | 8.230 |
| 30 | 3.577 | 6.737 |
| 31 | 3.607 | 8.167 |
| 32 | 3.617 | 8.127 |
| 35 | 3.653 | 6.792 |
| 36 | 3.671 | 7.122 |
| 37 | 3.697 | 8.557 |
| 38 | 3.700 | 7.463 |
| 39 | 3.728 | 8.307 |
| 40 | 3.758 | 8.204 |
| 41 | 3.795 | 8.365 |
| 42 | 3.853 | 7.758 |
| 43 | 3.904 | 7.953 |
| 44 | 3.911 | 8.014 |
| 45 | 3.932 | 8.714 |
| 46 | 3.946 | 9.604 |
| 47 | 4.000 | 8.842 |
| 48 | 4.008 | 8.701 |
| 49 | 4.066 | 8.501 |
| 50 | 4.089 | 8.785 |
| 51 | 4.107 | 10.311 |
| 52 | 4.108 | 8.999 |
| 53 | 4.297 | 8.812 |
| 54 | 4.308 | 8.589 |
| 55 | 5.195 | 8.110 |
| 56 | 5.219 | 10.049 |
| 57 | 5.225 | 10.131 |
| 58 | 5.436 | 10.386 |
| 59 | 5.513 | 8.646 |
| 60 | 5.576 | 11.055 |
| 61 | 5.678 | 8.719 |
| 62 | 5.680 | 9.188 |
| 63 | 5.715 | 8.260 |
| 64 | 5.790 | 11.432 |
| 65 | 5.861 | 10.504 |
| 66 | 5.900 | 10.717 |
| 67 | 5.966 | 10.578 |

As shown in Table. 4, the oxidization ratio of the reducing gas was recognized to be decreased to be not more than 11.432%. That is, the reducing gas of which the oxidization ratio becomes in the range of more than 0% and not more than 11.432% is supplied to the reduction reactors. Therefore, the amount of $CH_4$ gas was decreased as the fine carbonaceous materials are injected, and thereby the oxidization ratio of the reducing gas was recognized to be reduced to be not more than 11.432%.

Figure 8:
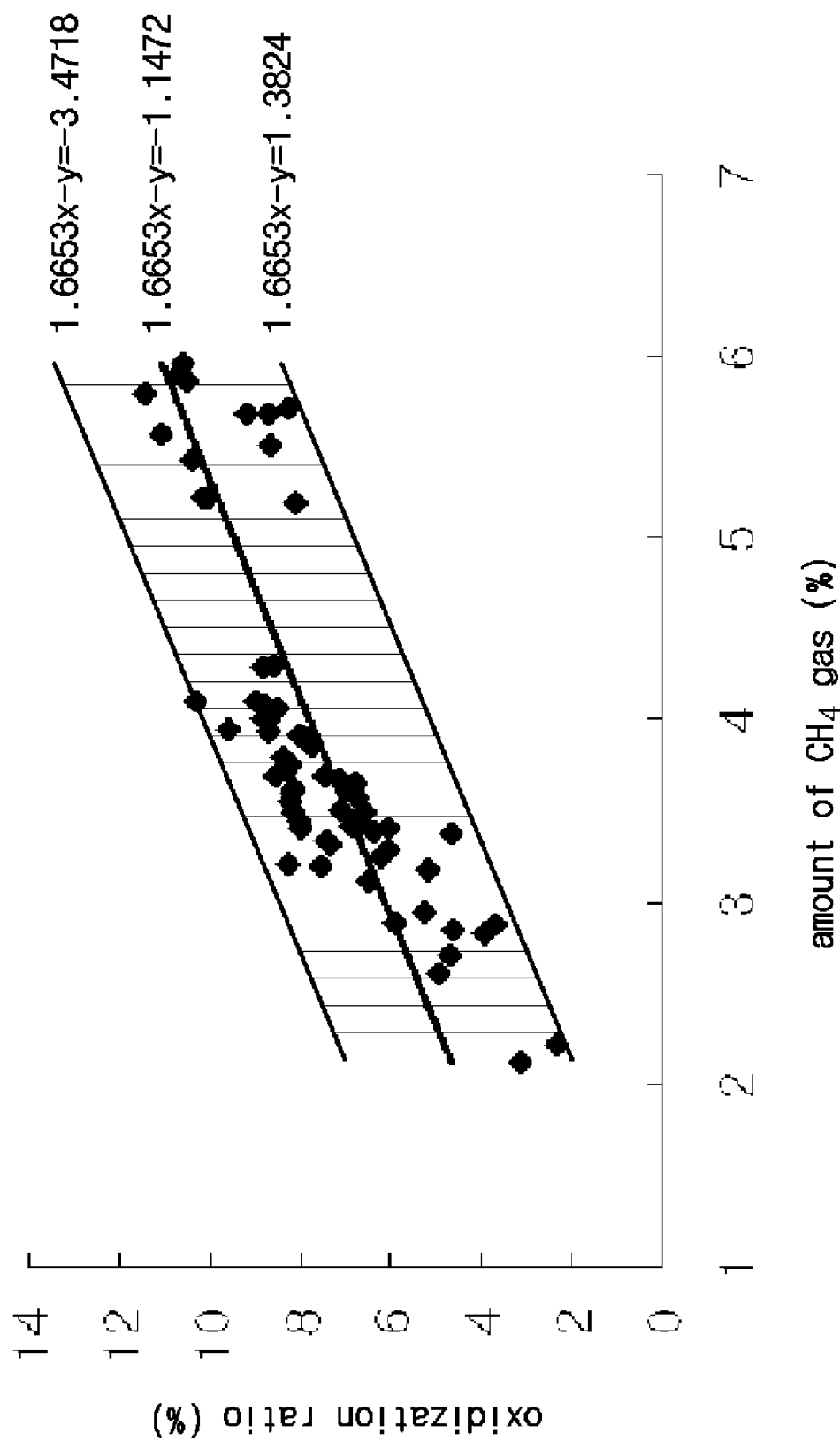
FIG. 8 is graph showing the relationship between an amount of $CH_4$ gas and an oxidization ratio of a reducing gas according to a second Exemplary example of the present invention.

The data of Table 4 are diagramed in FIG. 8. As shown in FIG. 8, it can be observed that the oxidization ratio of the reducing gas is increased as the amount of the $CH_4$ gas in the melter-gasifier is increased. That is, the reduction power of the reducing gas is increased. The linear function is calculated by least square method in order to draw a relationship between the amount of $CH_4$ gas in the melter-gasifier and the oxidization ratio of the reducing gas. Since the least square method can be understood by those skilled in the art in the technical field of the present invention, a detailed explanation thereof will be omitted. If x denotes the amount of $CH_4$ gas in the melter-gasifier and y denotes an oxidization ratio of the reducing gas in the melter-gasifier, it will be recognized that the following Formula 2 is substantially satisfied. That is, the amount of $CH_4$ gas and the oxidization ratio of the reducing gas satisfy the condition that is the same as the following Formula 2 or is similar to it.

$$1.6653x-y=-1.1472 \quad \text{[Formula 2]}$$

Here, the unit of x is vol %, the unit of y is %, and the unit of 1.6653 is %/vol %.

In addition, the data that are disposed on the straight lines that have the same slope as that of Formula 2 and are farthest from the straight line of Formula 2 were searched in order to find out the straight lines passing through the data corresponding to the upper limit and the lower limit among the data of Table 4.

As a result, 2.215 vol % of $CH_4$ gas and 2.307% of the oxidization ratio of the reducing gas shown in NO. 2 of Table 4 correspond to a lower limit, and 4.107 vol % of $CH_4$ gas and 10.311% of the oxidization ratio of the reducing gas shown in NO. 51 of Table 4 correspond to an upper limit.

Therefore, the range of straight lines, which pass through the above upper limit and lower limit and have the same slope as the straight line of Formula 2, can be shown as Formula 3. That is, the amount of $CH_4$ gas in the melter-gasifier (x) and the oxidization ratio of the reducing gas (y) substantially satisfy the following Formula 3. That is, the amount of $CH_4$ gas in the melter-gasifier and the oxidization ratio of the reducing gas satisfy the condition that is the same as the following Formula 3 or is similar to it.

$$-3.4718 \leq 1.6653x - y \leq 1.3824 \quad \text{[Formula 3]}$$

Here, the unit of x is vol %, the unit of y is %, and the unit of 1.3824 is %/vol %.

In accordance with Formula 3, the oxidization ratio of the reducing gas according to the decrease of the amount of $CH_4$ gas is shown as deviant crease lines in FIG. 8. As described above, it can be recognized that oxidation of the reducing gas is proportionally decreased as the amount of $CH_4$ is decreased with reference to Experimental example 2 of the present invention. Therefore, it may be recognized that the oxidization ratio of the reducing gas can be reduced by injecting the fine carbonaceous materials.

Experimental Example 3

In Experimental example 3, the variation of the reduction ratio of the reduced materials according to the oxidization ratio of the reducing gas is diagramed and the trend thereof was observed. That is, the oxidization ratio of the reducing gas in the melter-gasifier and the reduction ratio of the reduced materials reduced in the reduction reactors to which reducing gas is supplied were measured and diagramed. The measurement of the oxidization ratio of the reducing gas was carried out by the method which is the same as in the Experimental example 2. The reduction ratio of the reduced materials was measured by comparing the mixture containing iron ores before passing through the reduction reactors with the mixture containing iron ores after passing through the reduction reactors. Since the measurement of the oxidization ratio of the reducing gas and the reduction ratio of the reduced materials can be easily understood by those skilled in the art in the technical field of the present invention, the detailed explanation thereof will be omitted.

Figure 9:
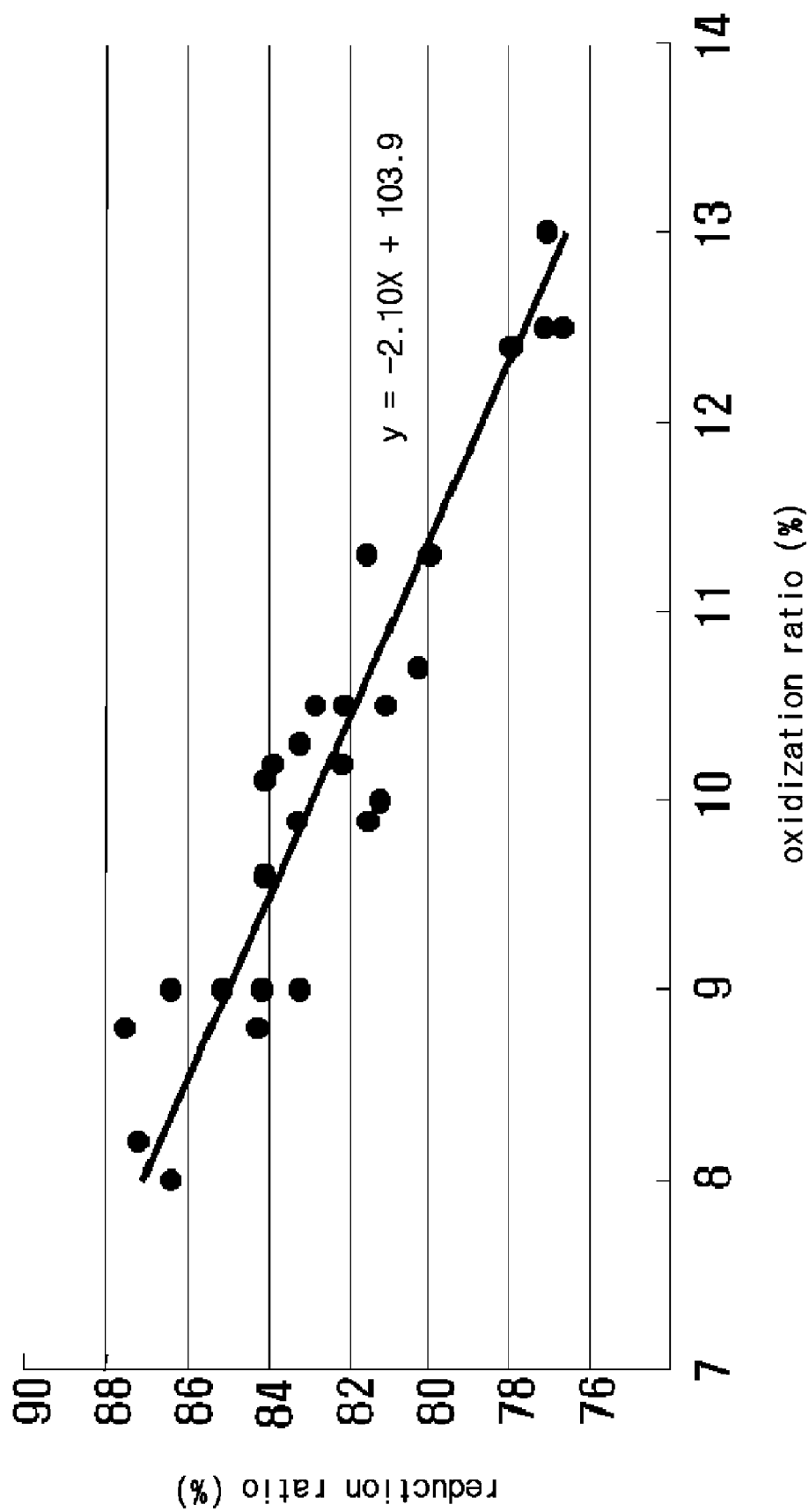
FIG. 9 is graph showing the relationship between an oxidization ratio of the reducing gas and a reduction ratio of the reduced materials according to the third embodiment of the present invention.

FIG. 9 shows an oxidization ratio of the reducing gas in the melter-gasifier as the x-axis and a reduction ratio of the reduced materials as the y-axis.

The relationship between the oxidization ratio of the reducing gas and the reduction ratio of the reduced materials shown as dots in FIG. 9 is straightly lined using least square method and then the result of the following Formula 4 is acquired. The oxidization ratio of the reducing gas (x) and the reduction ratio of the reduced materials (y) substantially satisfy the following Formula 4. That is, the oxidization ratio of the reducing gas (x) and the reduction ratio of the reduced materials (y) satisfy the condition that is the same as the following Formula 4 or is similar to it.

$$y = -2.10x + 103.9 \quad \text{[Formula 4]}$$

Here, the unit of x is %, the unit of y is %, and the unit of 103.9 is %.

As can be seen from Formula 4, the reduction ratio of the reduced materials is decreased when the oxidization ratio of the reducing gas is increased. Therefore, a consuming time for completely reducing the reduced materials in the melter-gasifier is reduced and so the production efficiency is improved.

That is, since the fine carbonaceous materials are injected into the center portion of a melter-gasifier at a hot temperature, the fine carbonaceous materials are completely burned and the volatile matters contained therein are converted into CO gas or $H_2$ gas. Therefore, the amount of $CH_4$ gas in the melter-gasifier caused by incomplete combustion is decreased. In addition, since the amount of $CH_4$ gas is decreased and the amount of CO gas or $H_2$ gas is increased, the amount of reducing gas generated from the melter-gasifier and supplied to the reduction reactors is increased. Therefore, oxidization of the reducing gas is increased. The reducing gas having improved oxidization ratio is supplied to the reduction reactors and the reduction ratio of the reduced materials passing through the reduction reactors is increased. Since the reduced materials, of which the reduction ratio is increased, are supplied to the melter-gasifier, reduced molten irons can finally be obtained even though a small amount of lumped carbonaceous materials are charged into the melter-gasifier. That is, an amount of lumped carbonaceous materials charged into the melter-gasifier is considerably reduced as the fine carbonaceous materials are injected, and thereby a fuel ratio is significantly reduced.

Experimental Example 4

In Experimental example 4, temperature variation of the raceway in the melter-gasifier was measured according to the injection of the fine carbonaceous materials. Assuming that the combustion is carried out in an adiabatic state and there is no heat loss outside of the raceway, the combustion temperature of the raceway was measured while the injecting amount of the fine carbonaceous materials is increased by 50 kg per 1 ton of molten irons. The temperature of the raceway was measured by using a thermocouple installed in the melter-gasifier, and the experimental results are shown in Table 5.

TABLE 5

| | injecting ratio of the fine carbonaceous materials (kg/p-t) | | | | |
|---|---|---|---|---|---|
| | 0 | 50 | 100 | 150 | 200 |
| combustion temperature (° C.) | 3878 | 3675 | 3484 | 3302 | 3131 |

As shown in Table 5, it can be recognized that combustion temperature is substantially decreased by 200° C. as the injecting amount of the fine carbonaceous materials is increased by 50 kg per 1 ton of molten irons. Namely, the combustion temperature is almost decreased by 200° C.

As can be seen from Experimental example 4 of the present invention, it is recognized that the combustion temperature in the melter-gasifier can be significantly reduced as the injecting amount of the fine carbonaceous materials is increased. Therefore, not only is the furnace heat of the melter-gasifier easily controlled, but also the Si content in the molten irons, which has a bad influence on the molten irons, can be reduced. In addition, the process of injecting fine carbonaceous materials can replace the process of moisturing through the tuyere for controlling furnace heat.

Figure 10:
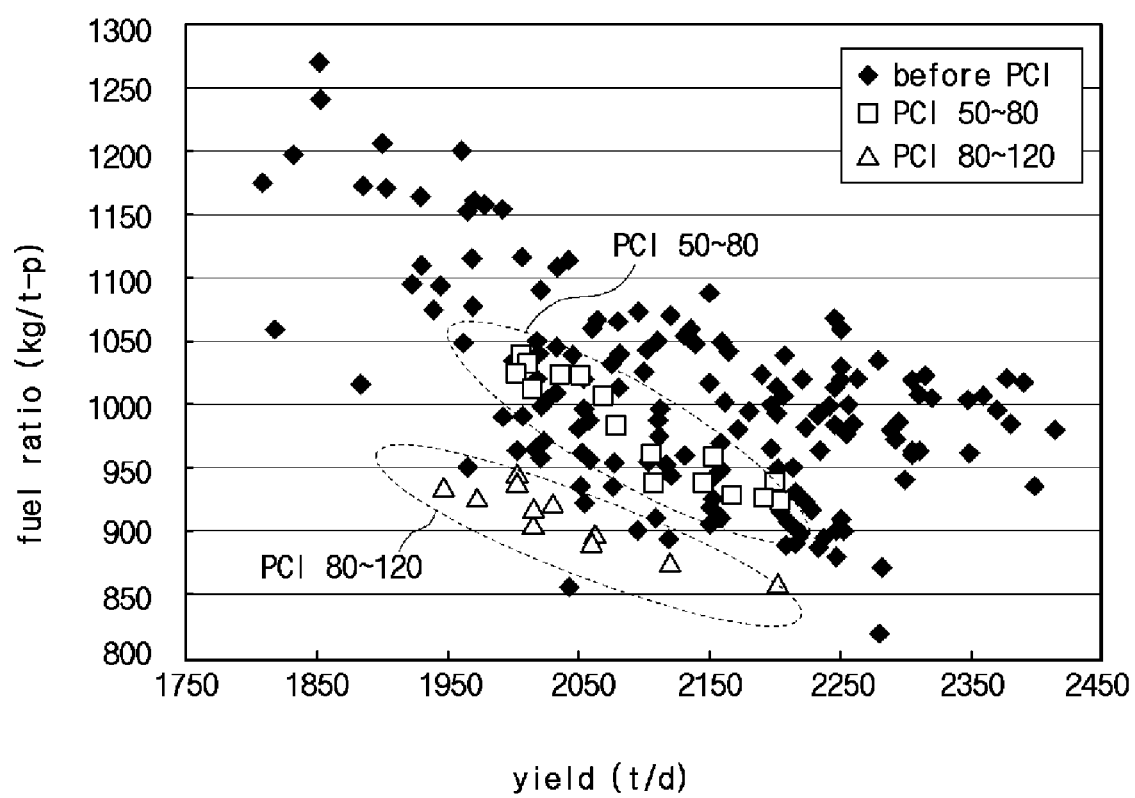
FIG. 10 is a graph showing a reducing effect of fuels by injecting fine carbonaceous materials when manufacturing molten irons according to the present invention.

FIG. 10 shows a variation of fuel ratio and yield according to the injection of the fine carbonaceous materials. In FIG. 10, variation of fuel ratio and yield is shown in a state before pulverized coal injection (PCI), in a state of injecting 50~80 kg/(p-t) of fine carbonaceous materials, and in a state of injecting 80~120 kg/(p-t) of fine carbonaceous materials. Assuming the same amount of molten irons is produced, it can be recognized that the fuel ratio is significantly reduced by injecting fine carbonaceous materials. That is, it can be recognized that the fuel ratio is reduced by 30 kg per 1 ton of molten irons as the fine carbonaceous materials are injected by 100 kg per 1 ton of molten irons.

If the fine carbonaceous materials are injected like above, the amount of reducing gas in the melter-gasifier is increased since volatile matters contained in the fine carbonaceous materials are completely burned. Since the reducing gas is increased and is supplied to the reduction reactors, the reduction ratio of the reduced materials passing through the reduction reactors can be increased. Therefore, the amount of lumped carbonaceous materials charged into the melter-gasifier for final reduction can be reduced. Namely, there is an effect that the fuel ratio can be reduced.

In addition, since fine carbonaceous materials are injected with oxygen through the tuyere of the melter-gasifier, there is an advantage that combustion temperature in the melter-gasifier can be controlled, the furnace heat can be delicately controlled and the coal packed bed can be stabilized.

Furthermore, the stagnating time of the charging materials in the melter-gasifier is increased when the fine carbonaceous materials are injected, and thereby the temperature of the dome portion is naturally increased. Accordingly, the flow amount of oxygen of the dust burner installed in the melter-gasifier can be reduced. Therefore, the reducing gas having an advantage in reduction can be obtained by reducing re-oxidization of the reducing gas.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. The method for manufacturing molten irons, comprising steps of:
   reducing mixtures containing iron ores in a reduction reactor and converting the mixtures containing iron ores into reduced materials;
   preparing lumped carbonaceous materials containing volatile matters as a heating source for melting the reduced materials;
   charging the lumped carbonaceous materials into a dome-shaped upper portion of a melter-gasifier and forming a coal packed bed;
   preparing fine carbonaceous materials containing volatile matters as a heating source for melting the reduced materials;
   injecting oxygen and the fine carbonaceous materials into the coal packed bed through a tuyere installed in the melter-gasifier;
   charging the reduced materials into the melter-gasifier connected to the reduction reactor and manufacturing molten irons; and
   supplying reducing gas in the melter-gasifier made from volatile matters contained both in the lumped carbonaceous materials and the fine carbonaceous materials to the reduction reactor.

2. The method for manufacturing molten irons of claim 1, wherein the fine carbonaceous materials contain volatile matters of the range from 8.0 wt % to 35.0 wt %, and the volatile matters contain carbon and hydrogen in the step of preparing fine carbonaceous materials containing volatile matters as a heating source for melting the reduced materials.

3. The method for manufacturing molten irons of claim 2, wherein the free swelling index (FSI) of the fine carbonaceous materials is not more than 6.0.

4. The method for manufacturing molten irons of claim 1, wherein the lumped carbonaceous materials contain volatile matters in the range from 20.0 wt % to 35.0 wt %, and the volatile matters contain carbon and hydrogen in the step of preparing lumped carbonaceous materials containing volatile matters as a heating source for melting the reduced materials.

5. The method for manufacturing molten irons of claim 4, wherein the grain size of the lumped carbonaceous materials is in the range from 8 mm to 35 mm.

6. The method for manufacturing molten irons of claim 1, wherein the step of preparing lumped carbonaceous materials comprises steps of:
   dividing raw coals into fine coals and lumped coals; and
   preparing lumped carbonaceous materials in which the lumped coals come in contact with hot gas and are then dried.

7. The method for manufacturing molten irons of claim 6, wherein the method for manufacturing molten irons further comprises a step of injecting the divided fine coals as the fine carbonaceous materials into the coal packed bed.

8. The method for manufacturing molten irons of claim 6, wherein the method for manufacturing molten irons further comprises a step of transferring fine coals, which are collected when the lumped coals come in contact with hot gas, and injecting the fine coals as the fine carbonaceous materials.

9. The method for manufacturing molten irons of claim 1, wherein the lumped carbonaceous materials comprise coal briquettes, and
   wherein the step of preparing lumped carbonaceous materials comprises steps of:
   dividing the raw coals into fine coals and lumped coals; and
   molding the fine coals and then manufacturing coal briquettes.

10. The method for manufacturing molten irons of claim 9, wherein the step of manufacturing the coal briquettes comprises steps of:
    drying the fine coals;
    adding a binder to the fine coals and mixing together; and
    molding the fine coals in which the binder is added and mixed together and manufacturing coal briquettes.

11. The method for manufacturing molten irons of claim 10, wherein the method for manufacturing molten irons further comprises a step of transferring the fine coals collected in the step of drying the fine coals and injecting the fine coals as the fine carbonaceous materials.

12. The method for manufacturing molten irons of claim 1, wherein the fine carbonaceous materials are made by crushing raw coals and a grain size of the crushed fine carbonaceous materials is not more than 3 mm in the step of injecting fine carbonaceous materials into the coal packed bed.

13. The method for manufacturing molten irons of claim 1, wherein a flow rate of the fine carbonaceous materials that are injected into the coal packed bed is controlled in the range from 40 m/sec to 70 m/sec in the step of injecting the fine carbonaceous materials into the coal packed bed.

14. The method for manufacturing molten irons of claim 1, wherein an oxidization ratio of the reducing gas decreases to be in the range of above 0% to 11.432% as an injecting amount of the fine carbonaceous materials increases in the step of supplying reducing gas to the reduction reactor.

15. The method for manufacturing molten irons of claim 14, wherein an amount of $CH_4$ gas in the melter-gasifier decreases as an injecting amount of the fine carbonaceous materials increases and an oxidization ratio of the reducing gas decreases as the amount of the $CH_4$ gas decreases.

16. The method for manufacturing molten irons of claim 15, wherein y=0.0001x is substantially satisfied when x denotes an injecting amount of the fine carbonaceous materials and y denotes a reducing amount of $CH_4$ gas in the melter-gasifier, where the unit of x is kg/t-p, the unit of y is %, and the unit of 0.0001 is %/(kg/t-p).

17. The method for manufacturing molten irons of claim 15, wherein $-3.4718 \leq 1.6653x-y \leq 1.3824$ is substantially satisfied when x denotes an amount of $CH_4$ gas in the melter-gasifier and y denotes an oxidization ratio of the reducing gas, where the unit of x is vol %, the an unit of y is %, and the unit of 1.3824 is %/vol %.

18. The method for manufacturing molten irons of claim 15, wherein $1.6653x-y=-1.1472$ is substantially satisfied when x denotes an amount of $CH_4$ gas in the melter-gasifier and y denotes an oxidization ratio of the reducing gas, where the unit of x is vol %, the unit of y is %, and the unit of 1.6653 is %/vol %.

19. The method for manufacturing molten irons of claim 15, wherein $y=-2.10x+103.9$ is substantially satisfied when x denotes an oxidization ratio of the reducing gas and y denotes a reduction ratio of the reduced materials, where the unit of x is %, the unit of y is %, and the unit of 103.9 is %.

20. The method for manufacturing molten irons of claim 1, wherein combusting temperature in the melter-gasifier is decreased as the injecting amount of the fine carbonaceous materials is increased in the step of injecting the fine carbonaceous materials into the coal packed bed.

21. The method for manufacturing molten irons of claim 20, wherein the combusting temperature in the melter-gasifier substantially is decreased by 200° C. whenever the amount of fine carbonaceous materials increases by 50 kg per 1 ton of molten irons.

22. The method for manufacturing molten irons of claim 1, wherein the mixtures containing iron ores are fluidized through multi-stage reduction reactors connected in order while converting the mixtures containing iron ores into the reduced materials in the step of reducing the mixtures containing iron ores in the reduction reactor and converting the mixtures containing iron ores into the reduced materials.

23. The method for manufacturing molten irons of claim 22, wherein the method for manufacturing molten irons further comprises a step of compacting the reduced materials before the reduced materials are charged into melter-gasifier.

24. The method for manufacturing molten irons of claim 1, wherein the reduction reactor is a fluidized bed reactor in the step of reducing the mixtures containing iron ores in the reduction reactor and converting the mixtures containing iron ores into the reduced materials.

25. The method for manufacturing molten irons of claim 1, wherein the reduction reactor is a packed bed reactor in the step of reducing the mixtures containing iron ores in the reduction reactor and converting the mixtures containing iron ores into the reduced materials.

26. The method for manufacturing molten irons of claim 1, wherein the length of a raceway formed ahead of the tuyere is in the range from 0.7 m to 1.0 m in the step of injecting oxygen and the fine carbonaceous materials into the coal packed bed through a tuyere installed in the melter-gasifier.

27. An apparatus for manufacturing molten irons, comprising:
 a reduction reactor for reducing mixtures containing iron ores and converting the mixtures containing iron ores into reduced materials;
 a coal supplying device for supplying lumped carbonaceous materials containing volatile matters as a heating source for melting the reduced materials;
 a melter-gasifier having a dome-shaped upper portion into which the reduced materials are charged and being connected to the reduction reactor, the melter-gasifier into which the lumped carbonaceous materials are charged and being connected to the coal supplying device, the melter-gasifier into which oxygen and fine carbonaceous materials containing volatile matters are injected through the tuyere installed in a side of the melter-gasifier;
 a fine carbonaceous materials supplying device for supplying the fine carbonaceous materials; and
 a reducing gas supplying line for supplying the reducing gas in the melter-gasifier made from the volatile matters contained both in the lumped carbonaceous materials and the fine carbonaceous materials to the reduction reactor.

28. The apparatus for manufacturing molten irons of claim 27, wherein the fine carbonaceous materials contain volatile matters in the range from 8.0 wt % to 35.0 wt % and the volatile matters contain carbon and hydrogen.

29. The apparatus for manufacturing molten irons of claim 28, wherein the free swelling index of the fine carbonaceous materials is not more than 6.0.

30. The apparatus for manufacturing molten irons of claim 27, wherein the lumped carbonaceous materials contain volatile matters in the range from 20.0 wt % to 35.0 wt % and the volatile matters contain carbon and hydrogen.

31. The apparatus for manufacturing molten irons of claim 27, wherein a grain size of the lumped carbonaceous materials is in the range from 8 mm to 35 mm.

32. The apparatus for manufacturing molten irons of claim 27, wherein the fine carbonaceous materials supplying device comprises:
 a raw coals storage bin for storing raw coals;
 a mill for crushing the raw coals and manufacturing the fine carbonaceous materials and being connected to the raw coals storage bin;
 a fine carbonaceous materials storage bin for storing the crushed and manufactured fine carbonaceous materials and being connected to the mill;
 a pressure balancing supplying device for supplying a suitable amount of the fine carbonaceous materials from the fine carbonaceous materials storage bin to the melter-gasifier;
 a divider installed above the melter-gasifier for controlling a supplying amount of the fine carbonaceous materials; and
 a fine carbonaceous materials supplying line for supplying the fine carboneous materials into the tuyere and being connected to the pressure balancing supplying device.

33. The apparatus for manufacturing molten irons of claim 32, wherein a plurality of dividers are connected to the tuyeres, respectively, and the fine carbonaceous materials are equally supplied to each divider and then are supplied to the tuyeres, respectively.

34. The apparatus for manufacturing molten irons of claim 27, wherein the apparatus for manufacturing molten irons further comprises:
 a mixing chamber installed near the tuyere;
 an adding gas supplying line for supplying an adding gas to the mixing chamber and being connected to the mixing chamber; and
 a fine carbonaceous materials injecting line for injecting the fine carbonaceous materials and being connected between the mixing chamber and the tuyeres,
 wherein the mixing chamber is connected to the fine carbonaceous materials supplying device, and the fine carbonaceous materials supplied from the fine carbonaceous materials supplying device are injected into the melter-gasifier through the fine carbonaceous materials injecting line by using the adding gas.

35. The apparatus for manufacturing molten irons of claim 34, wherein the fine carbonaceous materials are supplied to the mixing chamber with a transferring gas.

36. The apparatus for manufacturing molten irons of claim 34, wherein a flow rate of the fine carbonaceous materials discharged from the fine carbonaceous materials injecting line is controlled in the range from 40 m/sec to 70 m/sec by controlling an amount of adding gas supplied from the adding gas supplying line.

37. The apparatus for manufacturing molten irons of claim 34, wherein combustible gas is used as the adding gas.

38. The apparatus for manufacturing molten irons of claim 34, wherein the adding gas supplying line makes an angle in the range from 30 degrees to 90 degrees with the fine carbonaceous materials injecting line.

39. The apparatus for manufacturing molten irons of claim 27, wherein the coal supplying device comprises an apparatus for manufacturing coal briquettes for manufacturing and supplying coal briquettes by molding the fine coals.

40. The apparatus for manufacturing molten irons of claim 39, wherein the apparatus for manufacturing coal briquettes comprises:

a dryer for drying the fine coals;

a dust separator for collecting dust generated in the dryer; and a mixer connected to the dryer and adding a binder to the dried fine coals and mixing together; and a couple of rolls connected to the mixer and manufacturing coal briquettes by molding the fine coals to which the binder is added and mixed together.

41. The apparatus for manufacturing molten irons of claim 40, wherein the dust separator supplies the collected dust as the fine carbonaceous materials to the fine carbonaceous materials supplying device.

42. The apparatus for manufacturing molten irons of claim 39, wherein the fine carbonaceous materials supplying device is connected to the apparatus for manufacturing coal briquettes and the fine carbonaceous materials are supplied from the fine carbonaceous materials supplying device.

43. The apparatus for manufacturing molten irons of claim 27, wherein the reduction reactors are multi-stage fluidized bed reactors connected in order.

44. The apparatus for manufacturing molten irons of claim 43, wherein the apparatus for manufacturing molten irons further comprises an apparatus for manufacturing compacted irons for compacting the reduced materials and being connected to the reduction reactor and wherein the compacted irons manufactured in the apparatus for manufacturing compacted irons are supplied to the melter-gasifier.

45. The apparatus for manufacturing molten irons of claim 27, wherein the reduction reactor is a packed bed reactor.

46. The apparatus for manufacturing molten irons of claim 27, wherein the length of a raceway formed ahead of the tuyere is in the range from 0.7 m to 1.0 m.

* * * * *